US012654160B2

(12) United States Patent
Sung et al.

(10) Patent No.: US 12,654,160 B2
(45) Date of Patent: Jun. 16, 2026

(54) PERFORMANCE ENHANCEMENT OF A PLATINUM-CONTAINING CATALYST VIA EXHAUST GAS HYDROGEN ENRICHMENT

(71) Applicant: BASF MOBILE EMISSIONS CATALYSTS LLC, Iselin, NJ (US)

(72) Inventors: Shiang Sung, Iselin, NJ (US); Chunxin Ji, Iselin, NJ (US); Pavel Ruvinskiy, Novosibirsk (RU)

(73) Assignee: BASF Mobile Emissions Catalysts LLC, Iselin, NJ (US)

( * ) Notice: Subject to any disclaimer, the term of this patent is extended or adjusted under 35 U.S.C. 154(b) by 522 days.

(21) Appl. No.: 18/044,259

(22) PCT Filed: Sep. 7, 2021

(86) PCT No.: PCT/US2021/049246
§ 371 (c)(1),
(2) Date: Mar. 7, 2023

(87) PCT Pub. No.: WO2022/055855
PCT Pub. Date: Mar. 17, 2022

(65) Prior Publication Data
US 2023/0338940 A1      Oct. 26, 2023

Related U.S. Application Data

(60) Provisional application No. 63/075,570, filed on Sep. 8, 2020.

(51) Int. Cl.
| | |
|---|---|
| *B01J 23/44* | (2006.01) |
| *B01D 53/94* | (2006.01) |
| *B01J 21/04* | (2006.01) |
| *B01J 21/06* | (2006.01) |
| *B01J 23/10* | (2006.01) |
| *B01J 23/46* | (2006.01) |
| *B01J 35/00* | (2006.01) |
| *B01J 35/40* | (2024.01) |
| *B01J 35/56* | (2024.01) |
| *B01J 37/02* | (2006.01) |
| *B01J 37/08* | (2006.01) |

(Continued)

(52) U.S. Cl.
CPC ............ *B01J 35/19* (2024.01); *B01D 53/945* (2013.01); *B01D 53/9495* (2013.01); *B01J 21/04* (2013.01); *B01J 21/066* (2013.01); *B01J 23/10* (2013.01); *B01J 23/44* (2013.01); *B01J 23/464* (2013.01); *B01J 35/40* (2024.01); *B01J 35/56* (2024.01); *B01J 37/0219* (2013.01); *B01J 37/0228* (2013.01); *B01J 37/0244* (2013.01); *B01J 37/0248* (2013.01); *B01J 37/088* (2013.01); *F01N 3/101* (2013.01); *F01N 3/2073* (2013.01); *F01N 3/208* (2013.01); *F01N 3/2803* (2013.01); *F02M 25/10* (2013.01); *B01D*

*2251/202* (2013.01); *B01D 2255/1021* (2013.01); *B01D 2255/1023* (2013.01); *B01D 2255/1025* (2013.01); *B01D 2255/2042* (2013.01); *B01D 2255/2063* (2013.01); *B01D 2255/2065* (2013.01); *B01D 2255/20715* (2013.01); *B01D 2255/407* (2013.01); *B01D 2255/9022* (2013.01); *B01D 2255/9032* (2013.01); *B01D 2255/9035* (2013.01); *B01D 2255/908* (2013.01); *B01D 2255/9155* (2013.01); *B01D 2257/404* (2013.01); *B01D 2257/502* (2013.01); *B01D 2257/702* (2013.01); *B01D 2258/012* (2013.01); *F01N 2370/02* (2013.01); *F01N 2510/0684* (2013.01); *F01N 2610/04* (2013.01); *F01N 2610/1406* (2013.01); *F01N 2900/1402* (2013.01); *F01N 2900/1404* (2013.01)

(58) Field of Classification Search
None
See application file for complete search history.

(56) References Cited

U.S. PATENT DOCUMENTS

| | | | |
|---|---|---|---|
| 5,200,384 A * | 4/1993 | Funabiki | .............. B01J 37/0215 423/213.5 |
| 5,412,946 A | 5/1995 | Oshima et al. | |

(Continued)

FOREIGN PATENT DOCUMENTS

| | | | |
|---|---|---|---|
| CN | 108240252 | * | 7/2018 |
| EP | 1138382 | * | 3/2001 |

(Continued)

OTHER PUBLICATIONS

International Search Report and Written Opinion from corresponding PCT International Appln. No. PCT/US2021/049246 dated Dec. 21, 2021.

(Continued)

*Primary Examiner* — Sheng H Davis
(74) *Attorney, Agent, or Firm* — DLA Piper LLP (US)

(57) ABSTRACT

The disclosure provides a platinum-containing three-way conversion (TWC) catalyst, and a system for treating an exhaust gas stream from a gasoline engine using the TWC catalyst. The system is configured to introduce controlled quantities of hydrogen gas into the exhaust gas stream upstream of the platinum-containing TWC catalyst article during a cold-start period. Further provided are related methods of treating such exhaust streams. Such systems and methods are useful in reducing a level of one or more of hydrocarbons, carbon monoxide, and nitrogen oxide in a gaseous exhaust stream from a gasoline engine.

35 Claims, 17 Drawing Sheets

(51) Int. Cl.
F01N 3/10 (2006.01)
F01N 3/20 (2006.01)
F01N 3/28 (2006.01)
F02M 25/10 (2006.01)

(56) References Cited

U.S. PATENT DOCUMENTS

| | | | |
|---|---|---|---|
| 5,845,485 A | 12/1998 | Murphy et al. | |
| 6,810,657 B1 | 11/2004 | Benninger et al. | |
| 2010/0215557 A1* | 8/2010 | Liu ...................... | B01J 37/0225 |
| | | | 502/333 |
| 2014/0193304 A1* | 7/2014 | Cenci ......................... | B01J 7/02 |
| | | | 422/119 |
| 2018/0178198 A1 | 6/2018 | Deeba et al. | |
| 2018/0361360 A1 | 12/2018 | Xue et al. | |
| 2020/0032688 A1 | 1/2020 | Sung et al. | |

FOREIGN PATENT DOCUMENTS

| | | | | | |
|---|---|---|---|---|---|
| EP | 1138382 | A1 * | 10/2001 | ........... | B01J 23/464 |
| EP | 0885657 | B1 | 1/2008 | | |
| ES | 2754924 | * | 4/2020 | | |
| JP | 2003507631 | * | 2/2003 | | |
| JP | 2016037665 | * | 3/2016 | | |
| JP | 2020033903 | * | 3/2020 | | |
| WO | 2007/147041 | A2 | 12/2007 | | |
| WO | WO-2017103855 | A1 * | 6/2017 | ........... | B01J 23/464 |

OTHER PUBLICATIONS

International Preliminary Report from corresponding PCT International Appln. No. PCT/US2021/049246 dated Mar. 23, 2023.

* cited by examiner

PERFORMANCE ENHANCEMENT OF A PLATINUM-CONTAINING CATALYST VIA EXHAUST GAS HYDROGEN ENRICHMENT

This application claims priority to U.S. provisional patent Application No. 63/075,570, filed Sep. 8, 2020 and is incorporated herein by reference in its entirety.

The present disclosure relates to systems for treating an exhaust gas stream from a gasoline engine. The present disclosure also relates to a method of improving a catalytic activity of a platinum-containing three-way conversion (TWC) catalyst article in the purification of such exhaust gas streams. The systems and method use hydrogen as a reductant in the exhaust gas stream.

Environmental regulations for emissions of gasoline engines are becoming more stringent each year. Increasingly stringent emissions regulations have driven the need for developing emission gas treatment systems with improved capacity to manage nitrogen oxides ($NO_x$), carbon monoxide (CO), and hydrocarbon (HC) emissions at low engine exhaust temperatures. A major challenge for various automobile manufacturers is meeting new environmental regulation limits, such as the non-methane hydrocarbon and nitrogen oxide ($NMHC+NO_x$) limit.

Exhaust gas from vehicles powered by gasoline engines is typically treated with one or more three-way conversion (TWC) automotive catalysts. TWC catalysts typically contain platinum group metals (PGMs), such as, for example platinum (Pt), palladium (Pd), and rhodium (Rh), and are effective to abate CO, HC, and $NO_x$ pollutants in the exhaust of engines operated at or near stoichiometric air/fuel conditions. The precise proportion of air to fuel which results in stoichiometric conditions varies with the relative proportions of carbon and hydrogen in the fuel. An air-to-fuel (A/F) ratio is the mass ratio of air to fuel present in a combustion process, such as in an internal combustion engine. The stoichiometric A/F ratio corresponds to the complete combustion of a hydrocarbon fuel, such as gasoline, to carbon dioxide ($CO_2$) and water. The symbol $\lambda$ is thus used to represent the result of dividing a particular A/F ratio by the stoichiometric A/F ratio for a given fuel, so that: $\lambda=1$ is a stoichiometric mixture, $\lambda>1$ is a fuel-lean mixture, and $\lambda<1$ is a fuel-rich mixture. Conventional gasoline engines having electronic fuel injection and air intake systems provide a continually varying air-fuel mixture that quickly and constantly cycles between lean and rich exhaust. TWC catalysts, however, are not effective for reducing $NO_x$ emissions when the gasoline engine runs lean. Further, it is well known that catalysts utilized to treat the exhaust of internal combustion engines are less effective during the so-called "cold-start" period, which is the time period at the beginning of the treatment process, when the exhaust gas stream and the TWC catalyst are at low temperatures (i.e., below about 150° C.). At these low temperatures, TWC catalysts generally do not display sufficient catalytic activity for effectively treating HC, $NO_x$, and CO emissions. Though various exhaust gas treatment systems exist for the abatement of CO, HC, and $NO_x$ during cold-start conditions, there is still a need for developing emission gas treatment system(s) with improved capacity to manage CO, HC, and $NO_x$ emissions at low engine exhaust temperatures.

The present disclosure generally provides a system and related methods for abatement of pollutants in an exhaust gas stream of a gasoline engine, the system comprising a platinum-containing three-way conversion (TWC) catalyst article and a source of hydrogen gas ($H_2$). The system is configured to introduce $H_2$ from the $H_2$ source into the exhaust gas stream upstream of the TWC catalyst article during a cold-start period, and is configured to provide a ratio by volume of carbon monoxide (CO) to $H_2$ in the exhaust gas stream by modulating the $H_2$ introduction. Surprisingly, according to the present disclosure, it has been found that introducing a small amount of hydrogen gas ($H_2$) into the exhaust gas stream during the cold-start period can enhance TWC activity and minimize non-methane hydrocarbon and nitrogen oxide ($NMHC+NO_x$) emissions. It has been surprisingly found according to the present disclosure that introducing a small amount of hydrogen gas ($H_2$) into the exhaust gas stream during the cold-start period allows the use of TWC catalysts in which a portion of the bottom coat palladium (Pd) has been replaced by platinum (Pt). Such catalysts are advantageous in view of the extremely high cost of Pd, but demonstrate poor cold-start performance with respect to CO and hydrocarbon (HC) oxidation.

Accordingly, in one aspect, the disclosure provides a platinum-containing three-way conversion (TWC) catalyst article effective to oxidize carbon monoxide and hydrocarbons and reduce nitrogen oxides in an exhaust gas stream from a gasoline engine. The TWC platinum-containing catalyst article comprises a substrate, a first catalyst composition disposed on at least a portion of the substrate, and a second catalyst composition disposed on at least a portion of the substrate. The second catalyst composition comprises: a first palladium component, wherein at least a portion of the first palladium component is impregnated on a first refractory metal oxide support, and at least another portion of the first palladium component is impregnated on a first oxygen storage component; and a rhodium component impregnated on a second refractory metal oxide support. The first catalyst composition comprises: a second palladium component, wherein at least a portion of the second palladium component is impregnated on a third refractory metal oxide support, and at least another portion of the second palladium component is impregnated on a second oxygen storage component; and a platinum component, wherein the platinum component is impregnated on the third refractory metal oxide support, or wherein the platinum component is impregnated on the second oxygen storage component.

In some embodiments, the first refractory metal oxide support comprises alumina, zirconia, titania, ceria, or a combination thereof. In some embodiments, the first refractory metal oxide support is doped with a rare earth metal oxide. In some embodiments, the first refractory metal oxide support is lanthana-alumina, ceria-alumina, zirconia-alumina, ceria-zirconia-alumina, lanthana-zirconia-alumina, or lanthana-neodymia alumina. In some embodiments, the first refractory metal oxide support is lanthana-alumina.

In some embodiments, the rare earth metal oxide is lanthanum oxide, praseodymium oxide, yttrium oxide, neodymium oxide, or any combination thereof.

In some embodiments, the first oxygen storage component comprises ceria, zirconia, alumina, silica, titania, lanthana, baria, praseodymia, yttria, samaria, gadolinia, or a combination thereof. In some embodiments, the first oxygen storage component comprises ceria. In some embodiments, the first oxygen storage component is a ceria-zirconia composite comprising zirconia in an amount from about 5 wt % to about 20 wt %, based on the total weight of the ceria-zirconia composite.

In some embodiments, the rhodium component is present in an amount from about 0.05 wt % to about 5 wt %, based on the total weight of the second layer.

In some embodiments, the second refractory metal oxide support comprises alumina, zirconia, titania, ceria, or a combination thereof.

In some embodiments, the second refractory metal oxide support is doped with a rare earth metal oxide. In some embodiments, the second refractory metal oxide support is lanthana-alumina, ceria-alumina, zirconia-alumina, ceria-zirconia-alumina, lanthana-zirconia-alumina, or lanthana-neodymia alumina. In some embodiments, the second refractory metal oxide support is alumina.

In some embodiments, the third refractory metal oxide support comprises alumina, zirconia, titania, ceria, or combinations thereof. In some embodiments, the third refractory metal oxide support is doped with a rare earth metal oxide. In some embodiments, the third refractory metal oxide support is lanthana-alumina, ceria-alumina, zirconia-alumina, ceria-zirconia-alumina, lanthana-zirconia-alumina, or lanthana-neodymia alumina. In some embodiments, the third refractory metal oxide support is alumina.

In some embodiments, the second oxygen storage component comprises ceria, zirconia, alumina, silica, titania, lanthana, baria, praseodymia, yttria, samaria, gadolinia, or a combination thereof. In some embodiments, the second oxygen storage component comprises ceria. In some embodiments, the second oxygen storage component further comprises one or more of zirconia, lanthana, baria, praseodymia, yttria, samaria, gadolinia, or a combination thereof. In some embodiments, the oxygen storage component is a ceria-zirconia composite comprising zirconia in an amount from about 5 wt % to about 20 wt %, based on the total weight of the ceria-zirconia composite.

In some embodiments, the first catalyst composition further comprises a rare earth metal oxide, an alkaline earth metal component, or both. In some embodiments, the rare earth metal oxide is lanthanum oxide, praseodymium oxide, yttrium oxide, neodymium oxide, or any combination thereof. In some embodiments, the alkaline earth metal component is present in an amount from about 1 wt % to about 40 wt %, based on the total weight of the first layer. In some embodiments, the alkaline earth metal component comprises calcium, magnesium, strontium, barium, or a combination thereof. In some embodiments, the alkaline earth metal component is barium sulfate.

In some embodiments, the platinum component is impregnated on the third refractory metal oxide support. In some embodiments, the platinum component is impregnated on the second oxygen storage component.

In some embodiments, the second catalyst composition comprises: lanthana-doped alumina impregnated with a portion of the first palladium component; ceria-zirconia impregnated with a portion of the first palladium component; alumina impregnated with the rhodium component; and lanthanum oxide.

In some embodiments, the first catalyst composition comprises: alumina impregnated with the platinum component and a portion of the second palladium component; ceria-zirconia impregnated with a portion of the second palladium component; lanthanum oxide; and barium sulfate.

In some embodiments, the first catalyst composition comprises: alumina impregnated with a portion of the second palladium component; ceria-zirconia impregnated with platinum and a portion of the second palladium component; lanthanum oxide; and barium sulfate.

In some embodiments, the substrate is a metal or ceramic monolithic honeycomb substrate. In some embodiments, the metal or ceramic monolithic honeycomb substrate is a wall-flow filter substrate or a flow through substrate.

In some embodiments, the first catalyst composition is disposed on the substrate as a first catalyst layer, and the second catalyst composition is disposed on the first catalyst layer.

In another aspect, there is provided a system for treating an exhaust gas stream from a gasoline engine, the system comprising the platinum-containing TWC catalyst article as disclosed herein, located downstream of and in fluid communication with the gasoline engine; a source of hydrogen gas ($H_2$); a feedback sensor located upstream from the platinum-containing TWC catalyst article and in contact with the exhaust gas stream; and a control unit in communication with the feedback sensor; wherein the system is configured to introduce $H_2$ from the $H_2$ source into the exhaust gas stream upstream of the platinum-containing TWC catalyst article during a cold-start period, and wherein the feedback sensor is configured to provide $H_2$ in the exhaust gas stream by modulating the $H_2$ introduction.

In some embodiments, the feedback sensors comprise a wide-band oxygen sensor (UEGO) and a temperature sensor.

In some embodiments, the source of $H_2$ is an on-board compressed hydrogen vessel.

In some embodiments, the source of $H_2$ is an on-board hydrogen generator. In some embodiments, the on-board hydrogen generator comprises an alcohol reformer, an ammonia decomposition apparatus, an electrolysis apparatus, a fuel reformer, an exhaust gas reformer, or a combination thereof. In some embodiments, the on-board hydrogen generator is an exhaust gas reformer comprising a catalytic reforming article located upstream from the catalytic article and in fluid communication with the exhaust gas stream. In some embodiments, the on-board hydrogen generator comprises at least one $H_2$ generating component comprising a dopant comprising nanoparticles of aluminum, nanoparticles of aluminum-nickel, nanoparticles of aluminum/silica, nanoparticles of aluminum/cobalt, nanoparticles of aluminum/magnesium, nanoparticles of alumina, nanoparticles of magnesium, nanoparticles of magnesium-nickel, nanoparticles of zinc, sodium borohydride, or a combination thereof, and wherein the at least one $H_2$ generating component added to a gasoline fuel prior to combustion of said fuel in the gasoline engine.

In some embodiments, the system further comprises a $H_2$ injection article upstream from the platinum containing TWC catalyst article, upstream from the feedback sensor, in fluid communication with the exhaust gas stream and with the $H_2$ source, and in communication with the control unit; the $H_2$ injection article configured to introduce $H_2$ from the $H_2$ source into the exhaust gas stream upstream of the platinum containing TWC catalyst article.

In some embodiments, the system is configured to introduce $H_2$ into the exhaust gas stream when the exhaust gas stream temperature upstream of or within the platinum containing TWC catalytic article is in a range of from about 90° C. to about 190° C.

In some embodiments, when a temperature of the exhaust gas stream upstream of or within the platinum-containing TWC catalytic article is in a range of from about 90° C. to about 550° C., the exhaust gas stream contains no greater than about 20 vol. % of $H_2$. In some embodiments, the exhaust gas stream contains no greater than about 2 vol. % of $H_2$. In some embodiments, the exhaust gas stream contains no greater than about 0.5 vol. % of $H_2$.

In some embodiments, the system is configured to introduce $H_2$ into the exhaust gas stream to provide a given $\Delta\lambda$ value no less negative than about −0.345 for a period of time, wherein:

$$\Delta\lambda = \bar{\lambda} - \lambda°;$$

$\lambda$ ° is a pre-defined value; and $\overline{\lambda}$ is a running average air-to-fuel ratio of the exhaust gas stream, calculated for a length of time according to the formula:

$$\overline{\lambda} = \frac{\sum_{i=1}^{N} \lambda_i}{N};$$

wherein (N) is the number of points comprised in this length of time, and $\lambda_i$ is the air-to-fuel ratio at each point.

In some embodiments, $\Delta\lambda$ is about $-0.060$. In some embodiments, $\Delta\lambda$ is about $-0.014$.

In a further aspect there is provided a method of treating an exhaust gas stream from a gasoline engine, the method comprising: contacting the exhaust gas stream with the platinum-containing TWC catalyst article as disclosed herein, located downstream of the gasoline engine and in fluid communication with the exhaust gas stream; introducing hydrogen gas ($H_2$) from a $H_2$ source into the exhaust gas stream upstream of the platinum-containing TWC catalyst article; and controlling a concentration by volume of $H_2$ in the exhaust gas stream upstream from the platinum-containing TWC catalyst article, wherein controlling the concentration by volume of $H_2$ comprises modulating the $H_2$ introduction.

In some embodiments, controlling the concentration by volume of $H_2$ comprises introducing $H_2$ into the exhaust gas stream when a temperature of the exhaust gas stream upstream from or inside the platinum-containing TWC catalyst article is in a range from about 90° C. to about 550° C. In some embodiments, controlling the concentration by volume of $H_2$ comprises introducing $H_2$ into the exhaust gas stream when the reading from the temperature sensor positioned upstream or inside the platinum-containing TWC catalyst article is in a range from about 90° C. to about 190° C. In some embodiments, the $H_2$ is introduced for about 200 seconds.

In some embodiments, modulating the $H_2$ introduction comprises: obtaining a signal from a feedback sensor, a temperature sensor, or a combination thereof, wherein the feedback sensor is located upstream from the platinum-containing TWC catalyst article, and the temperature sensor is located upstream from or inside the platinum-containing TWC catalyst article, and both sensors are in contact with the exhaust gas stream; and controlling a quantity of $H_2$ introduced using said signal.

In some embodiments, the exhaust gas stream contains no greater than about 20 vol. % of $H_2$. In some embodiments, the exhaust gas stream contains no greater than about 2 vol. % of $H_2$. In some embodiments, the exhaust gas stream contains no greater than about 0.5 vol. % of $H_2$.

In some embodiments, the method comprises introducing $H_2$ into the exhaust gas stream; and providing a $\Delta\lambda$ value no less negative than about $-0.345$ for a period of time, wherein:

$$\Delta\lambda = \overline{\lambda} - \lambda°;$$

$\lambda°$ is a pre-defined value; and $\overline{\lambda}$ is a running average air-to-fuel ratio of the exhaust gas stream, calculated for a length of time according to the formula:

$$\overline{\lambda} = \frac{\sum_{i=1}^{N} \lambda_i}{N};$$

wherein (N) is the number of points comprised in this length of time, and $\lambda_i$ is the air-to-fuel ratio at each point.

In some embodiments, $\Delta\lambda$ is about $-0.060$. In some embodiments, $\Delta\lambda$ is about $-0.014$.

In some embodiments, introducing $H_2$ further comprises generating $H_2$ during the combustion of gasoline in the gasoline engine, wherein generating $H_2$ comprises adding at least one $H_2$ generating component to the gasoline prior to combustion. In some embodiments, the at least one $H_2$ generating component comprises a dopant comprising nanoparticles of aluminum, nanoparticles of aluminum-nickel, nanoparticles of aluminum/silica, nanoparticles of aluminum/cobalt, nanoparticles of aluminum/magnesium, nanoparticles of alumina, nanoparticles of magnesium, nanoparticles of magnesium-nickel, nanoparticles of zinc, sodium borohydride, or a combination thereof.

In some embodiments, the method further comprises a vehicle comprising the gasoline engine and the platinum-containing TWC catalyst article. In some embodiments, the at least one $H_2$ generating component is added to the gasoline on board the vehicle. In some embodiments, the at least one $H_2$ generating component is added to the gasoline externally to the vehicle.

In some embodiments, introducing $H_2$ further comprises generating $H_2$ wherein generating $H_2$ comprises contacting the exhaust gas stream with an exhaust gas reforming catalyst.

In a still further aspect, there is provided a method for reducing a level of one or more of hydrocarbons, carbon monoxide, nitrogen oxide, and particulate matter in a gaseous exhaust stream from a gasoline engine, the method comprising contacting the gaseous exhaust stream with the exhaust gas treatment system as disclosed herein.

In yet another aspect, there is provided a method of enhancing the cold-start catalytic performance of the platinum-containing TWC catalyst article as disclosed herein, the method comprising: contacting the exhaust gas stream with the platinum-containing TWC catalyst article, wherein the platinum-containing TWC catalyst article is positioned downstream of the gasoline engine and in fluid communication with the exhaust gas stream; and controlling a $H_2$ concentration in the exhaust gas stream for a period of time, wherein controlling the $H_2$ concentration comprises: introducing hydrogen gas ($H_2$) from a $H_2$ source into the exhaust gas stream upstream of the platinum-containing TWC catalyst article; and modulating the $H_2$ introduction, wherein modulating the $H_2$ introduction comprises obtaining a signal from a feedback sensor and/or a temperature sensor, the feedback sensor located upstream from the platinum-containing TWC catalyst article, and the temperature sensor located upstream from or inside the platinum-containing TWC catalyst article, both sensors in contact with the exhaust gas stream; and controlling a quantity of $H_2$ introduced using said signal.

In some embodiments, modulating comprises introducing $H_2$ into the exhaust gas stream when the signal from the temperature sensor corresponds to a temperature in the range from about 90° C. to about 190° C. In some embodiments, the period of time is up to about 200 seconds.

These and other features and aspects of the disclosure will be apparent from the following detailed description together with the accompanying drawings, which are briefly described below. The present disclosure includes any combination of two, three, four, or more of the above-noted embodiments as well as combinations of any two, three, four, or more features or elements set forth in this disclosure, regardless of whether such features or elements are expressly combined in a specific embodiment description herein. This disclosure is intended to be read holistically such that any separable features or elements of the disclosure, in any of its various aspects and embodiments, should be viewed as intended to be combinable unless the context clearly dictates otherwise. Other aspects of the present disclosure will become apparent from the following.

BRIEF DESCRIPTION OF THE DRAWINGS

In order to provide an understanding of embodiments of the present disclosure, reference is made to the appended drawings in which reference numerals refer to components of exemplary embodiments of the disclosure. The drawings are exemplary only, and should not be construed as limiting the disclosure. The disclosure described herein is illustrated by way of example and not by way of limitation in the accompanying figures. For simplicity and clarity of illustration, features illustrated in the figures are not necessarily drawn to scale. For example, the dimensions of some features may be exaggerated relative to other features for clarity. Further, where considered appropriate, reference labels have been repeated among the figures to indicate corresponding or analogous elements.

Figure 1A:
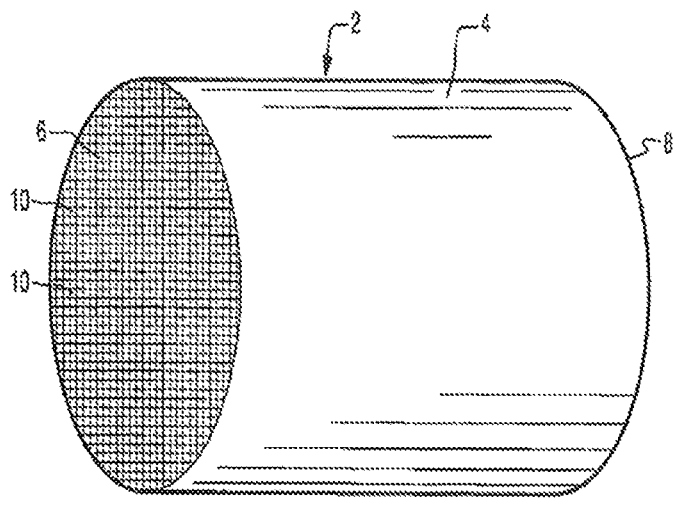
FIG. 1A is a perspective view of a honeycomb-type substrate which may comprise an oxidation catalyst composition in accordance with the present disclosure.

The present disclosure generally provides a system for abatement of pollutants in an exhaust gas stream of a gasoline engine along with related methods. The system comprises a tri-metal three-way conversion (TWC) catalyst article and a source of hydrogen gas ($H_2$). The system is configured to introduce $H_2$ from the $H_2$ source into the exhaust gas stream upstream of the TWC catalyst article during a cold-start period, and is configured to provide a ratio by volume of CO to $H_2$ in the exhaust gas stream by modulating the $H_2$ introduction. Surprisingly, according to the present disclosure, it has been found that introducing a small amount of $H_2$ into the exhaust gas stream during the cold-start period can enhance downstream TWC catalyst activity, and minimize non-methane hydrocarbon and nitrogen oxide ($NMHC+NO_x$) emissions. It has been surprisingly found that introducing a small amount of $H_2$ into the exhaust gas stream during the cold-start period allows the use of TWC catalysts in which a portion of the bottom coat palladium (Pd) has been replaced by platinum (Pt), which is highly advantageous from a cost standpoint.

Before describing several exemplary embodiments of the present disclosure, it is to be understood that the disclosure is not limited to the details of construction or process steps set forth in the following description. The present disclosure is capable of other embodiments and of being practiced or being carried out in various ways.

Definitions

With respect to the terms used in this disclosure, the following definitions are provided.

The articles "a" and "an" are used herein to refer to one or to more than one (i.e., to at least one) of the grammatical object of the article.

The term "about" used throughout this specification is used to describe and account for small fluctuations. For example, the term "about" can refer to less than or equal to ±5%, such as less than or equal to ±2%, less than or equal to ±1%, less than or equal to ±0.5%, less than or equal to ±0.2%, less than or equal to ±0.1% or less than or equal to ±0.05%. All numeric values herein are modified by the term "about," whether or not explicitly indicated. A value modified by the term "about" of course includes the specific value. For instance, "about 5.0" must include 5.0.

The term "associated" means for instance "equipped with," "connected to," or in "communication with," for example "electrically connected" or in "fluid communication with" or otherwise connected in a way to perform a function. The term "associated" may mean directly associated with or indirectly associated with, for instance through one or more other articles or elements.

The terms "catalyst" or "catalyst material" or "catalyst composition" or "catalytic material" refer to materials that promote a reaction. To produce catalytic articles, a substrate as disclosed herein below is coated with a catalyst composition. The coatings are "catalytic coating compositions" or "catalytic coatings." The terms "catalyst composition" and "catalytic coating composition" are synonymous.

The term "catalytic article" in the present disclosure means an article comprising a substrate having a catalyst coating composition. In the present systems, an exhaust gas stream is passed through the catalytic article by entering the upstream end and exiting the downstream end. The inlet end of a catalytic article is synonymous with the "upstream" end or "front" end. The outlet end is synonymous with the "downstream" end or "rear" end.

The term "configured" as used in the description and claims is intended to be an open-ended term as are the terms "comprising" or "containing". The term "configured" is not meant to exclude other possible articles or elements. The term "configured" may be equivalent to "adapted".

Present systems comprise one or more "functional articles" or simply "articles". Functional articles comprise one or more certain functional elements, for instance reservoirs, tubing, pumps, valves, batteries, circuitry, meters, nozzles, reactors, filters, funnels, and the like. The systems are integrated, that is, having interconnected articles and/or elements.

The term "in fluid communication" is used to refer to articles positioned on the same exhaust line, i.e., a common exhaust stream passes through articles that are in fluid communication with each other. Articles in fluid communication may be adjacent to each other in the exhaust line.

The term "NO_x" refers to nitrogen oxide compounds, such as NO and NO_2.

The terms "on" and "over" in reference to a coating layer may be used synonymously. The term "directly on" means in direct contact with. The disclosed articles are referred to in certain embodiments as comprising one coating layer "on" a second coating layer, and such language is intended to encompass embodiments with intervening layers, where direct contact between the coating layers is not required (i.e., "on" is not equated with "directly on").

A "support" in a catalytic material or catalyst washcoat refers to a material that receives metals (e.g., platinum group metals), stabilizers, promoters, binders, and the like through precipitation, association, dispersion, impregnation, or other suitable methods. Exemplary supports include refractory metal oxide supports as described herein below.

As used herein, the term "substrate" refers to the monolithic material onto which the catalyst composition, that is, catalytic coating, is disposed, typically in the form of a washcoat. In one or more embodiments, the substrates are flow-through monoliths and monolithic wall-flow filters. A washcoat is formed by preparing a slurry containing a specified solids content (e.g., about 30% by weight to about 90% by weight) of catalyst in a liquid, which is then coated onto a substrate and dried to provide a washcoat layer. Reference to "monolithic substrate" means a unitary structure that is homogeneous and continuous from inlet to outlet.

"Washcoat" has its usual meaning in the art of a thin, adherent coating of a material (e.g., a catalyst) applied to a "substrate", such as a honeycomb flow-through monolith substrate or a filter substrate which is sufficiently porous to permit the passage therethrough of the gas stream being treated. As used herein and as described in Heck, Ronald and Farrauto, Robert, Catalytic Air Pollution Control, New York: Wiley-Interscience, 2002, pp. 18-19, a washcoat layer includes a compositionally distinct layer of material disposed on the surface of a monolithic substrate or an underlying washcoat layer. A substrate can contain one or more washcoat layers, and each washcoat layer can be different in some way (e.g., may differ in physical properties thereof such as, for example particle size or crystallite phase) and/or may differ in the chemical catalytic functions.

Unless otherwise indicated, all parts and percentages are by weight. "Weight percent (wt %)," if not otherwise indicated, is based on an entire composition free of any volatiles, that is, based on dry solids content.

All methods described herein can be performed in any suitable order unless otherwise indicated herein or otherwise clearly contradicted by context. The use of any and all examples, or exemplary language (e.g., "such as") provided herein, is intended merely to better illuminate the materials and methods and does not pose a limitation on the scope unless otherwise claimed. No language in the specification should be construed as indicating any non-claimed element as essential to the practice of the disclosed materials and methods.

All U.S. patent applications, published patent applications, and patents referred to herein are hereby incorporated by reference.

I. Exhaust Gas Treatment System

The exhaust gas treatment systems as disclosed herein generally comprise a three-way conversion (TWC) catalyst article, a source of hydrogen gas (H_2), a control unit, and a feedback sensor. Each system component is further described herein below.

Three-Way Conversion (TWC) Catalyst Composition

The exhaust gas treatment systems as disclosed herein generally comprise a three-way conversion (TWC) catalyst article comprising a TWC catalyst composition. As used herein, "TWC" refers to any catalyst composition known in the art for the conversion of HC, CO, and/or NO_x. TWC catalysts typically contain platinum group metal (PGM) components, such as, for example platinum (Pt), palladium (Pd), and rhodium (Rh), impregnated onto a porous support material. Pt and Pd are generally used for HC and CO conversion, while Rh is more effective for the reduction of NO_x. Optionally, a TWC catalyst may include an oxygen storage component (OSC) and one or more refractory metal oxide supports.

In some embodiments, the TWC catalyst article is a platinum-containing TWC catalyst article, comprising a platinum-containing TWC catalyst composition. As used herein, "platinum-containing TWC catalyst composition" refers to a TWC catalyst composition containing three platinum group metal components. The individual components of the platinum-containing TWC catalyst composition are described further herein below.

Platinum Group Metal Component

The platinum-containing TWC catalyst composition as disclosed herein comprises three platinum group metals. A platinum group metal (PGM) component refers to any component that includes a PGM (Ru, Rh, Os, Ir, Pd, Pt, and/or Au). For example, the PGM may be in metallic form, with zero valence, or the PGM may be in an oxide form. For example, in certain embodiments, the PGM may be substantially (e.g., at least about 90% by weight) or wholly in metallic form (zero valance), or the PGM may be in an oxide form. Reference to "PGM component" allows for the presence of the PGM in any valence state. The terms "platinum (Pt) component," "rhodium (Rh) component," "palladium (Pd) component," "iridium (Ir) component," "ruthenium (Ru) component," and the like refer to the respective platinum group metal compound, complex, or the like which, upon calcination or use of the catalyst, decomposes or otherwise converts to a catalytically active form, usually the metal or the metal oxide. The platinum-containing TWC catalyst compositions as disclosed herein generally comprise a platinum (Pt) component, a palladium (Pd) component, and a rhodium (Rh) component. Specifically, in platinum-containing TWC catalyst compositions as disclosed herein, a portion of the Pd typically present in a conventional TWC is replaced by Pt, as disclosed herein further below.

In some embodiments, reference is made to a first palladium component and a second palladium component, so as to distinguish each palladium component which may be present. In these embodiments, the term "palladium component" has the same meaning as defined above with respect to palladium component. The second palladium component may be of the same form as or in a different form from the first palladium component (e.g., palladium metal and/or a palladium oxide). In some embodiments, the first and second palladium components will be of the same form.

Oxygen Storage Component

The platinum-containing TWC catalyst composition as disclosed herein comprises an oxygen storage component (OSC). As used herein, the term "oxygen storage component" (OSC) refers to an entity that has a multi-valence state and can actively react with reductants, such as carbon monoxide (CO) and/or hydrogen under reduction conditions and then react with oxidants, such as oxygen or nitrogen oxides under oxidative conditions. Examples of oxygen storage components include rare earth oxides, such as ceria, lanthana, praseodymia, neodymia, niobia, europia, samaria, ytterbia, yttria, zirconia, and mixtures thereof in addition to ceria.

In some embodiments, the oxygen storage component is selected from ceria, zirconia, lanthana, yttria, neodymia, praseodymia, niobia, and combinations thereof. In some embodiments, the oxygen storage component comprises ceria. In some embodiments, the OSC comprises ceria in combination with one or more other materials including, for example, zirconium (Zr), titanium (Ta), lanthanum (La), praseodymium (Pr), neodymium (Nd), niobium (Nb), yttrium (Y), nickel (Ni), manganese (Mn), iron (Fe) copper (Cu), silver (Ag), gold (Au), samarium (Sm), gadolinium (Gd), and combinations comprising at least one of the foregoing metals. Various oxides (e.g., the metal in combination with oxygen (O)) may also be used, including, for example, zirconium oxide ($ZrO_2$), titania ($TiO_2$), praseodymia ($Pr_6O_{11}$), yttria ($Y_2O_3$), neodymia ($Nd_2O_3$), lanthana ($La_2O_3$), gadolinium oxide ($Gd_2O_3$), or mixtures comprising at least one of the foregoing. Such combinations may be referred to as mixed oxide composites. For example, a "ceria-zirconia composite" means a composite comprising ceria and zirconia, without specifying the amount of either component. Suitable ceria-zirconia composites include, but are not limited to, composites having a ceria content ranging from about 5% to about 95% (e.g., at least about 5%, at least about 15%, at least about 30%, at least about 40%, at least about 50%, at least about 60%, at least about 70%, at least about 80%, at least about 90%, or at least about 95% ceria content with an upper boundary of about 100%). In some embodiments, suitable ceria-zirconia composites have a ceria content ranging from about 5% to about 75% by weight of the total ceria-zirconia composite. In some embodiments, suitable ceria-zirconia composites have a ceria content ranging from about 10% to about 70% by weight of the total ceria-zirconia composite. In some embodiments, the oxygen storage component further comprises (e.g., is doped with) one or more of zirconia, alumina, silica, titania, lanthana, baria, praseodymia, yttria, samaria, gadolinia, or a combination thereof. In some embodiments, the oxygen storage component is ceria-zirconia comprising ceria in an amount from about 5 wt % to about 75 wt. %. In some embodiments, the oxygen storage component is a ceria-zirconia composite comprising zirconia in an amount from about 5 wt % to about 20 wt %, such as about 5 wt %, about 10 wt %, about 15 wt %, or about 20 wt % zirconia, based on the total weight of the ceria-zirconia composite.

In some embodiments, reference is made to a second OSC. In these embodiments, "OSC" has the same meaning as defined with respect to the first OSC. In some embodiments, the first and second OSC are each independently selected. In some embodiments, the first and second OSC are the same.

In some embodiments, the first oxygen storage component comprises ceria, zirconia, alumina, silica, titania, lanthana, baria, praseodymia, yttria, samaria, gadolinia, or a combination thereof. In some embodiments, the first oxygen storage component comprises ceria. In some embodiments, the first oxygen storage component further comprises one or more of zirconia, alumina, silica, titania, lanthana, baria, praseodymia, yttria, samaria, gadolinia, or a combination thereof. In some embodiments, the first oxygen storage component is a ceria-zirconia composite comprising zirconia in an amount from about 5 wt % to about 20 wt %, based on the total weight of the ceria-zirconia composite.

In some embodiments, the second oxygen storage component comprises ceria, zirconia, alumina, silica, titania, lanthana, baria, praseodymia, yttria, samaria, gadolinia, or a combination thereof. In some embodiments, the second oxygen storage component comprises ceria. In some embodiments, the second oxygen storage component further comprises one or more of zirconia, alumina, silica, titania, lanthana, baria, praseodymia, yttria, samaria, gadolinia, or a combination thereof. In some embodiments, the second oxygen storage component is a ceria-zirconia composite comprising zirconia in an amount from about 5 wt % to about 20 wt %, based on the total weight of the ceria-zirconia composite.

Refractory Metal Oxide

The platinum-containing TWC catalyst composition as disclosed herein comprises a refractory metal oxide support. "Refractory metal oxide supports" are metal oxide supports (e.g., for supporting PGMs and other TWC catalyst composition components) which exhibit chemical and physical stability at high temperatures, such as the temperatures associated with gasoline or diesel engine exhaust. Exemplary refractory metal oxide supports include alumina, silica, zirconia, titania, ceria, magnesia, and other materials known for such use, as well as physical mixtures or chemical combinations thereof, including atomically-doped combinations and including high surface area or activated compounds, such as activated alumina. Included are combinations of metal oxides such as silica-alumina, ceria-zirconia, praseodymia-ceria, alumina-zirconia, alumina-ceria-zirconia, lanthana-alumina, lanthana-zirconia-alumina, baria-alumina, baria-lanthana-alumina, baria-lanthana-neodymia-alumina, and alumina-ceria. In some embodiments, refractory metal oxide supports useful in the platinum-containing TWC catalyst compositions disclosed herein are doped alumina materials, such as Si-doped alumina materials (including, but not limited to about 1% to about 10% $SiO_2$—$Al_2O_3$), doped titania materials, such as Si-doped titania materials (including, but not limited to about 1% to about 10% $SiO_2$—$TiO_2$) or doped zirconia materials, such as Si-doped $ZrO_2$ (including, but not limited to about 5% to about 30% $SiO_2$—$ZrO_2$).

Refractory metal oxide supports may be referred to as "high surface area" refractory metal oxide supports. "High surface area refractory metal oxide supports" refer specifically to support particles generally exhibiting a BET surface area in excess of about 60 m²/g, and often up to about about 200 m²/g or higher, for example, up to about 350 m²/g. "BET surface area" has its usual meaning of referring to the Brunauer-Emmett-Teller method for determining surface area by $N_2$ adsorption measurements. Unless otherwise stated, "surface area" refers to BET surface area. In some embodiments, the high surface area support material has a surface area of at least about 90 m²/g, such as from about 90 m²/g to about 200 m²/g, or from about 90 m²/g to about 150 m²/g. Suitable high surface area refractory metal oxide supports include, but are not limited to, activated alumina. Such activated alumina is usually a mixture of the gamma and delta phases of alumina, but may also contain substantial amounts of eta, kappa, and theta alumina phases.

In some embodiments, a refractory metal oxide support is modified ("doped") with a rare earth metal oxide. As used herein, "rare earth metal oxide" refers to one or more oxides of scandium, yttrium, and the lanthanum series, as defined in the Periodic Table of Elements, e.g., Sc, Y, Zr, Nb, W, La, Ce, Nd, Pr, Sm, Eu, Gd, Nd, or combinations thereof. For example, in some embodiments, the refractory metal oxide support is doped with a rare earth metal oxide selected from lanthanum oxide, praseodymium oxide, yttrium oxide, neodymium oxide, or any combination thereof. In some embodiments, the refractory metal oxide support is doped with lanthanum oxide. In some embodiments, the amount of dopant used to modify the refractory metal oxide support can range from about 0.5% to about 50% by weight, based on the weight of refractory metal oxide support. As such, the rare earth metal oxide may be added to a previously formed refractory metal oxide material utilizing impregnation methods as otherwise described herein. In some embodiments, a refractory metal oxide support comprises the rare earth metal oxide in the form of a mixed oxide.

In some embodiments, reference is made to a first refractory metal oxide, a second refractory metal oxide, or a third refractory metal oxide, so as to distinguish each refractory metal oxide support which may be present. In these embodiments, "refractory metal oxide" has the same meaning as defined with respect to refractory metal oxide. In some embodiments, the first, second, and third refractory metal oxides are each independently selected. In some embodiments, the first, second, and third refractory metal oxides are the same. In some embodiments, the first and second refractory metal oxides are the same. In some embodiments, the first and third refractory metal oxides are the same. In some embodiments, the second and third refractory metal oxides are the same.

In some embodiments, the first refractory metal oxide support comprises alumina, zirconia, titania, ceria, or combinations thereof. In some embodiments, the first refractory metal oxide support is doped with a rare earth metal oxide. In some embodiments, the first refractory metal oxide support is lanthana-alumina, ceria-alumina, zirconia-alumina, ceria-zirconia-alumina, lanthana-zirconia-alumina, or lanthana-neodymia alumina. In some embodiments, the first refractory metal oxide support is lanthana-alumina.

In some embodiments, the second refractory metal oxide support comprises alumina, zirconia, titania, ceria, or combinations thereof. In some embodiments, the second refractory metal oxide support is doped with a rare earth metal oxide. In some embodiments, the second refractory metal oxide support is lanthana-alumina, ceria-alumina, zirconia-alumina, ceria-zirconia-alumina, lanthana-zirconia-alumina, or lanthana-neodymia alumina. In some embodiments, the second refractory metal oxide support is alumina.

In some embodiments, the third refractory metal oxide support comprises alumina, zirconia, titania, ceria, or combinations thereof. In some embodiments, the third refractory metal oxide support is doped with a rare earth metal oxide. In some embodiments, the third refractory metal oxide support is lanthana-alumina, ceria-alumina, zirconia-alumina, ceria-zirconia-alumina, lanthana-zirconia-alumina, or lanthana-neodymia alumina. In some embodiments, the third refractory metal oxide support is alumina.

Rare Earth Metal Oxide

In some embodiments, the platinum-containing TWC catalyst composition comprises a rare earth metal oxide, which may be the same of different from the rare earth metal oxide described above with reference to doped refractory metal oxide supports. For example, the first catalyst composition, the second catalyst composition, or both, of the platinum-containing TWC article may comprise a rare earth metal oxide, as described further herein below. In some embodiments, the rare earth metal oxide is lanthanum oxide, praseodymium oxide, yttrium oxide, neodymium oxide, or any combination thereof. The concentration of the rare earth metal oxide can vary, but will typically be from about 3 wt % to about 10 wt %, or from about 3 wt % to about 5 wt %, based on the total weight of a washcoat comprising the rare earth metal oxide.

Alkaline Earth Metal Component

In some embodiments, the platinum-containing TWC catalyst composition comprises an alkaline earth metal component. As used herein, the term "alkaline earth metal component" refers to an alkaline earth metal compound, complex, or the like which, upon calcination or use of the catalyst, decomposes or otherwise converts to a catalytically active form, usually the metal oxide or a thermally stable compound. As used herein, the term "alkaline earth metal" refers to Group II metals such as magnesium, calcium, strontium, and barium. In some embodiments, the alkaline earth metal component is an oxide or sulfate of barium, calcium, magnesium, strontium, or a mixture thereof. In some embodiments, the alkaline earth metal component is an oxide of barium (i.e., BaO). In some embodiments, the alkaline earth metal component is a sulfate of barium (i.e., $BaSO_4$). In some embodiments, the alkaline earth metal component is impregnated in or disposed on the refractory metal oxide support (i.e., the refractory metal oxide support is doped with an alkaline earth metal component).

The concentration of the alkaline earth metal component present in the platinum-containing TWC catalyst composition can vary, before example, it can be from about 1 wt % to about 30 wt %, or from about 1 wt % to about 20 wt %, or from about 1 wt % to about 10 wt %, based on the total weight of a washcoat comprising the alkaline earth metal component.

Platinum-Containing Three-Way Conversion Catalyst Article

The platinum-containing TWC catalyst article as disclosed herein comprises a substrate on which is disposed the platinum-containing TWC catalyst composition as disclosed herein. For example, the platinum-containing TWC catalyst article comprises a first catalyst composition disposed on at least a portion of the substrate and a second catalyst composition disposed on at least a portion of the substrate.

The second catalyst composition comprises a first palladium component, wherein at least a portion of the first palladium component is impregnated on a first refractory metal oxide support, and at least another portion of the first palladium component is impregnated on a first oxygen storage component, each component as described herein above. The second catalyst composition further comprises a rhodium component impregnated on a second refractory metal oxide support, wherein each component is as described herein above.

In some embodiments, the second catalyst composition comprises lanthana-doped alumina impregnated with a portion of the first palladium component; ceria-zirconia impregnated with a portion of the first palladium component; and alumina impregnated with the rhodium component. In some embodiments, the second catalyst composition further comprises a rare earth metal oxide. In some embodiments, the rare earth metal oxide is lanthanum oxide.

The concentration of the first Pd component in the second catalyst composition can vary, for example it can be from about 0.1 wt % to about 15 wt %, or from about 0.1 wt % to 1.5 wt %, relative to the total weight of the supports (i.e., first and second refractory metal oxide and OSC) in the second catalyst composition.

The concentration of the rhodium component can vary, for example, it can be from about 0.05 wt % to about 5 wt %, from about 0.1 to about 3 wt %, or from about 0.5 wt % to about 2.5 wt %, relative to the weight of the support material (i.e., the second refractory metal oxide support) on which it is supported.

The first catalyst composition comprises a second palladium component, wherein at least a portion of the second palladium component is impregnated on a third refractory metal oxide support, and at least another portion of the second palladium component is impregnated on a second oxygen storage component, each component as described herein above. The second palladium component may be the same form as or in a different form from the first palladium component (e.g., palladium metal and/or a palladium oxide) . . . . In some embodiments, the first and second palladium components will be in the same form The concentration of the second Pd component can vary, for example it can be from about 0.1 wt % to about 10 wt % relative to the total weight of the supports (i.e., third refractory metal oxide and second OSC) in the first catalyst composition.

In some embodiments, the total amount of the second palladium component present in the first catalyst composition is about 3 g/ft³ to about 200 g/ft³, or from about 3 g/ft³ to about 100 g/ft³, or from about 3 g/ft³ to about 30 g/ft³. In some embodiments, the second palladium component is present on the third refractory metal oxide support in an amount of about 1.5 g/ft³ to about 100 g/ft³, or from about 1.5 g/ft³ to about 50 g/ft³, or from about 1.5 g/ft³ to about 15 g/ft³, and is present in an amount of about 1.5 g/ft³ to about 100 g/ft³, or from about 1.5 g/ft³ to about 50 g/ft³, or from about 1.5 g/ft³ to about 15 g/ft³ on the second oxygen storage component. In some embodiments, the total amount of the second palladium component present in the first catalyst composition is about 31 g/ft³. In some embodiments, the second palladium component is present on the third refractory metal oxide support in an amount of about 15.5 g/ft³, and is present in an amount of about 15.5 g/ft³ on the second oxygen storage component.

The first catalyst composition further comprises a platinum component, wherein the platinum component is impregnated on the third refractory metal oxide support, or is impregnated on the second oxygen storage component.

In some embodiments, the platinum component is impregnated on the third refractory metal oxide support. In some embodiments, the platinum component is impregnated on the second oxygen storage component. The concentration of the Pt component can vary, For example it can be from about 0.1 wt % to about 10 wt % relative to the total weight of the supports (i.e., third refractory metal oxide and second OSC) in the first catalyst composition.

In some embodiments, the total amount of the platinum component present in the first catalyst composition is from about 3 g/ft³ to about 200 g/ft³, or from about 3 g/ft³ to about 100 g/ft³, or from about 3 g/ft³ to about 30 g/ft³. In some embodiments, the platinum component is present on the third refractory metal oxide support in an amount from about 3 g/ft³ to about 200 g/ft³, or from about 3 g/ft³ to about 100 g/ft³ or from about 3 g/ft³ to about 30 g/ft³. In some embodiments, the platinum component is present on the on the second oxygen storage component in an amount from about 3 g/ft³ to about 200 g/ft³, or from about 3 g/ft³ to about 100 g/ft³ or from about 3 g/ft³ to about 30 g/ft³. In some embodiments, a molar ratio of the platinum component to the second palladium component is from about 2 to about 0.5, In some embodiments, the molar ratio is about 1.

In some embodiments, the first catalyst composition further comprises a rare earth metal oxide, an alkaline earth metal component, or both, each as described herein above.

In some embodiments, the first catalyst composition comprises alumina impregnated with the platinum component and a portion of the second palladium component; ceria-zirconia impregnated with a portion of the second palladium component; and further comprises lanthanum oxide and barium sulfate.

In some embodiments, the alumina is impregnated with the platinum component at a concentration of from about 3 g/ft³ to about 200 g/ft³, or from about 3 g/ft³ to about 100 g/ft³, or from about 3 g/ft³ to about 30 g/ft³; the alumina is impregnated with the second palladium component at a concentration of about 1.5 g/ft³ to about 100 g/ft³, or from about 1.5 g/ft³ to about 50 g/ft³, or from about 1.5 g/ft³ to about 15 g/ft³ on; and the ceria-zirconia is impregnated with the second palladium component at a concentration of about 1.5 g/ft³ to about 100 g/ft³, or from about 1.5 g/ft³ to about 50 g/ft³, or from about 1.5 g/ft³ to about 15 g/ft³.

In other embodiments, the alumina is impregnated with the second palladium component at a concentration of about 1.5 g/ft³ to about 100 g/ft³ or from about 1.5 g/ft³ to about 50 g/ft³, or from about 1.5 g/ft³ to about 15 g/ft³; the alumina is impregnated with the platinum component at a concentration of about 3 g/ft³ to about 200 g/ft³, or from about 3 g/ft³ to about 100 g/ft³, or from about 3 g/ft³ to about 30 g/ft³; and the ceria-zirconia is impregnated with the second palladium component at a concentration of about 1.5 g/ft³ to about 100 g/ft³, or from about 1.5 g/ft³ to about 50 g/ft³, or from about 1.5 g/ft³ to about 15 g/ft³.

In some embodiments, the catalytic article of the present disclosure comprises a substrate having the first and second catalyst compositions as disclosed herein disposed thereon. Suitable layering arrangements and substrates are described further herein below.

Substrate

The TWC catalyst articles described herein may comprise a platinum-containing TWC catalyst composition disposed on a substrate. Useful substrates are 3-dimensional, having a length and a diameter and a volume, similar to a cylinder. The shape does not necessarily have to conform to a cylinder. The length is an axial length defined by an inlet end and an outlet end.

The substrate may be constructed of any material typically used for preparing automotive catalysts and will, for example, comprise a metal or ceramic honeycomb structure. The substrate typically provides a plurality of wall surfaces upon which the washcoat composition is applied and adhered, thereby acting as a substrate for the catalyst composition.

Ceramic substrates may be made of any suitable refractory material, e.g. cordierite, cordierite-α-alumina, aluminum titanate, silicon titanate, silicon carbide, silicon nitride, zircon mullite, spodumene, alumina-silica-magnesia, zircon silicate, sillimanite, a magnesium silicate, zircon, petalite, α-alumina, an aluminosilicate, and the like.

Substrates may also be metallic, comprising one or more metals or metal alloys. A metallic substrate may include any metallic substrate, such as those with openings or "punch-outs" in the channel walls. The metallic substrates may be employed in various shapes such as pellets, compressed metallic fibers, corrugated sheet, or monolithic foam. Specific examples of metallic substrates include heat-resistant, base-metal alloys, such as those in which iron is a substantial or major component. Such alloys may contain one or more of nickel, chromium, and aluminum, and the total of these metals may comprise at least about 15 wt % (weight percent) of the alloy, for instance, about 10 wt % to about 25 wt % chromium, about 1 wt % to about 8 wt % of aluminum, and from about 0 wt % to about 20 wt % of nickel, in each case based on the weight of the substrate. Examples of metallic substrates include those having straight channels; those having protruding blades along the axial channels to disrupt gas flow and to open communication of gas flow between channels; and those having blades and also holes to enhance gas transport between channels allowing for radial gas transport throughout the monolith.

Any suitable substrate for the catalytic articles disclosed herein may be employed, such as a monolithic substrate of the type having fine, parallel gas flow passages extending therethrough from an inlet or an outlet face of the substrate such that passages are open to fluid flow therethrough ("flow-through substrate"). Another suitable substrate is of the type have a plurality of fine, substantially parallel gas flow passages extending along the longitudinal axis of the substrate where, for example, each passage is blocked at one end of the substrate body, with alternate passages blocked at opposite end-faces ("wall-flow filter"). Flow-through and wall-flow substrates are also taught, for example, in International Application Publication No. WO2016/070090, which is incorporated herein by reference in its entirety. In some embodiments, the catalyst substrate comprises a honeycomb substrate in the form of a wall-flow filter or a flow-through substrate. In some embodiments, the substrate is a wall-flow filter. Flow-through substrates and wall-flow filters will be further discussed herein below Flow-Through Substrates In some embodiments, the substrate is a flow-through substrate (e.g., monolithic substrate, including a flow-through honeycomb monolithic substrate). Flow-through substrates have fine, parallel gas flow passages extending from an inlet end to an outlet end of the substrate such that passages are open to fluid flow. The passages, which are essentially straight paths from their fluid inlet to their fluid outlet, are defined by walls on which a catalytic coating is disposed so that gases flowing through the passages contact the catalytic material. The flow passages of the flow-through substrate are thin-walled channels, which can be of any suitable cross-sectional shape and size such as trapezoidal, rectangular, square, sinusoidal, hexagonal, oval, circular, etc. The flow-through substrate can be ceramic or metallic as described above.

Flow-through substrates can, for example, have a volume of from about 50 in³ to about 1200 in³, a cell density (inlet openings) of from about 60 cells per square inch (cpsi) to about 500 cpsi or up to about 900 cpsi, for example from about 200 cpsi to about 400 cpsi and a wall thickness of from about 50 microns to about 200 microns or about 400 microns.

Figure 1B:
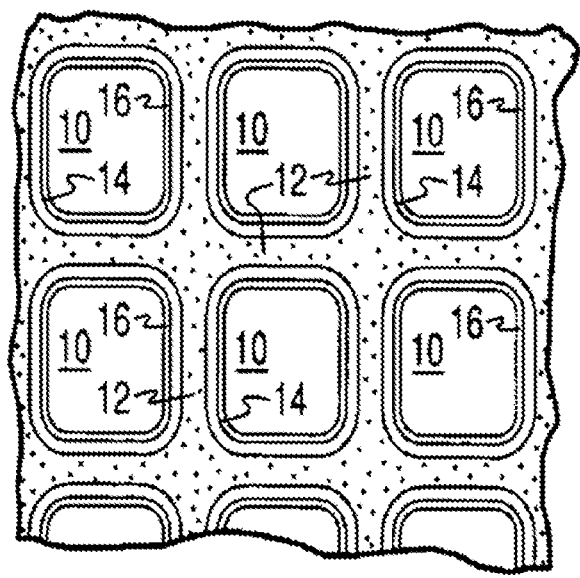
FIG. 1B is a partial cross-sectional view enlarged relative to FIG. 1A and taken along a plane parallel to the end faces of the substrate of FIG. 1A, which shows an enlarged view of a plurality of the gas flow passages shown in FIG. 1A, in an embodiment wherein the substrate is a flow-through substrate.

A catalytic article can be provided by applying a catalytic coating (e.g., as disclosed herein) to the substrate as a washcoat. FIGS. 1A and 1B illustrate an exemplary substrate 2 in the form of a flow-through substrate coated with a catalyst composition as described herein. Referring to FIG. 1A, the exemplary substrate 2 has a cylindrical shape and a cylindrical outer surface 4, an upstream end face 6 and a corresponding downstream end face 8, which is identical to upstream end face 6. Substrate 2 has a plurality of fine, parallel gas flow passages 10 formed therein. As seen in FIG. 1B, flow passages 10 are formed by walls 12 and extend through carrier 2 from upstream end face 6 to downstream end face 8, the passages 10 being unobstructed so as to permit the flow of a fluid, e.g., a gas stream, longitudinally through carrier 2 via gas flow passages 10 thereof. As more easily seen in FIG. 1B, walls 12 are so dimensioned and configured that gas flow passages 10 have a substantially regular polygonal shape. As shown, the catalyst composition can be applied in multiple, distinct layers if desired. In the illustrated embodiment, the catalyst composition consists of both a discrete bottom layer 14 adhered to the walls 12 of the carrier member and a second discrete top layer 16 coated over the bottom layer 14. The present disclosure can be practiced with one or more (e.g., two, three, or four or more) catalyst composition layers and is not limited to the two-layer embodiment illustrated in FIG. 1B. Further coating configurations are disclosed herein below.

Wall-Flow Filter Substrates

In some embodiments, the substrate is a wall-flow filter, which generally has a plurality of fine, substantially parallel gas flow passages extending along the longitudinal axis of the substrate. Typically, each passage is blocked at one end of the substrate body, with alternate passages blocked at opposite end-faces. Such monolithic wall-flow filter substrates may contain up to about 900 or more flow passages (or "cells") per square inch of cross-section, although far fewer may be used. For example, the substrate may have from about 7 to about 600, more usually from about 100 to about 400, cells per square inch ("cpsi"). The cells can have cross-sections that are rectangular, square, circular, oval, triangular, hexagonal, or are of other polygonal shapes.

Figure 2:
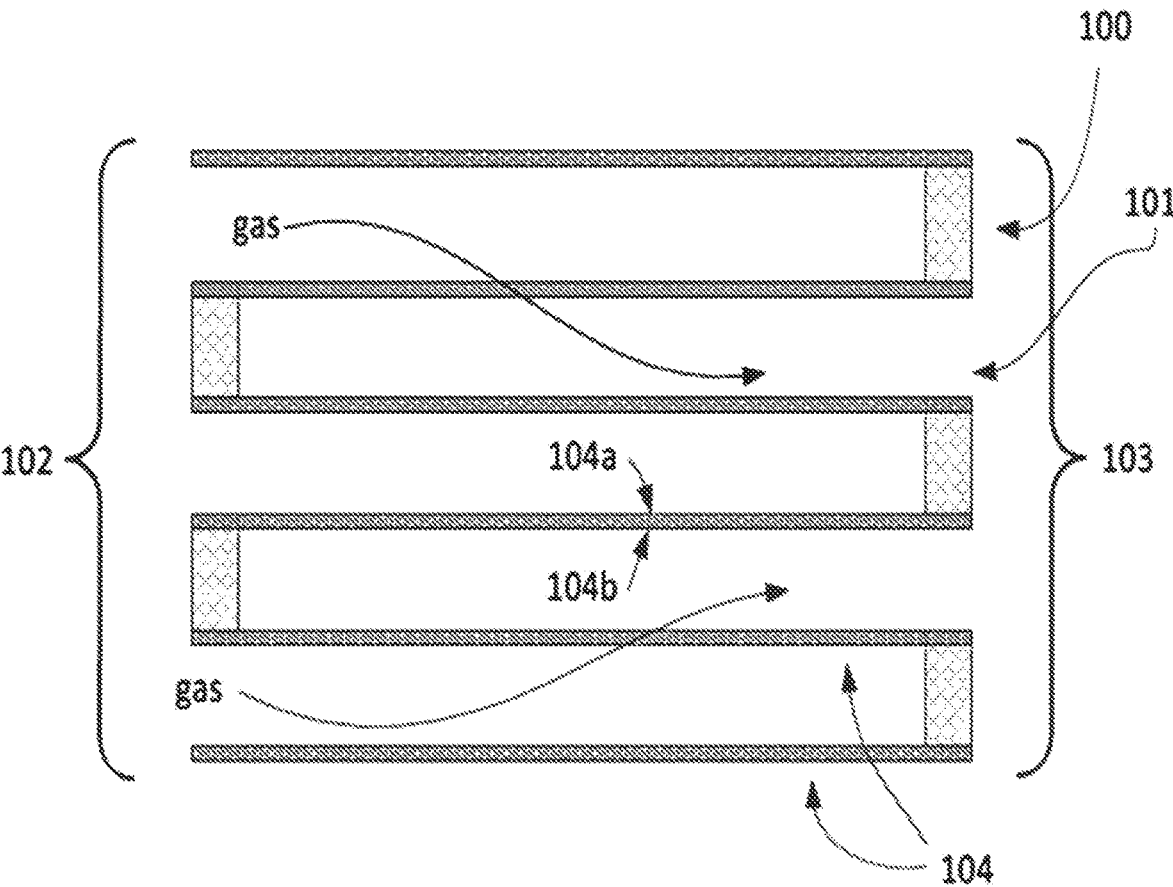
FIG. 2 is a cutaway view of a representative wall-flow filter.

A cross-section view of a monolithic wall-flow filter substrate section is illustrated in FIG. 2, showing alternating plugged and open passages (cells). Blocked or plugged ends 100 alternate with open passages 101, with each opposing end open and blocked, respectively. The filter has an inlet end 102 and outlet end 103. The arrows crossing porous cell walls 104 represent exhaust gas flow entering the open cell ends, diffusion through the porous cell walls 104 and exiting the open outlet cell ends. Plugged ends 100 encourage diffusion through the cell walls. Each cell wall will have an inlet side 104a and outlet side 104b. The passages are enclosed by the cell walls.

The wall-flow filter article substrate may have a volume of, for instance, from about 50 cm$^3$, about 100 cm$^3$, about 200 cm$^3$, about 300 cm$^3$, about 400 cm$^3$, about 500 cm$^3$, about 600 cm$^3$, about 700 cm$^3$, about 800 cm$^3$, about 900 cm$^3$ or about 1000 cm$^3$ to about 1500 cm$^3$, about 2000 cm$^3$, about 2500 cm$^3$, about 3000 cm$^3$, about 3500 cm$^3$, about 4000 cm$^3$, about 4500 cm$^3$ or about 5000 cm$^3$. Wall-flow filter substrates typically have a wall thickness from about 50 microns to about 2000 microns, for example from about 50 microns to about 450 microns or from about 150 microns to about 400 microns.

The walls of the wall-flow filter are porous and generally have a wall porosity of at least about 50% or at least about 60% with an average pore size of at least about 5 microns prior to disposition of the functional coating. For instance, the wall-flow filter article substrate in some embodiments will have a porosity of about ≥50%, about ≥60%, about ≥65% or about ≥70%. For instance, the wall-flow filter article substrate will have a wall porosity of from about 50%, about 60%, about 65% or about 70% to about 75%, about 80% or about 85% and an average pore size of from about 5 microns, about 10 microns, about 20 microns, about 30 microns, about 40 microns, or about 50 microns to about 60 microns, about 70 microns, about 80 microns, about 90 microns, or about 100 microns prior to disposition of a catalytic coating. The terms "wall porosity" and "substrate porosity" mean the same thing and are interchangeable. Porosity is the ratio of void volume divided by the total volume of a substrate. Pore size may be determined according to ISO15901-2 (static volumetric) procedure for nitrogen pore size analysis. Nitrogen pore size may be determined on Micromeritics TRISTAR 3000 series instruments. Nitrogen pore size may be determined using BJH (Barrett-Joyner-Halenda) calculations and 33 desorption points. Useful wall-flow filters have high porosity, allowing high loadings of catalyst compositions without excessive backpressure during operation.

Coatings

A substrate is coated with a catalyst composition to form a catalytic article. The catalytic coating may comprise one or more thin, adherent coating layers disposed on and in adherence to least a portion of a substrate. In some embodiment, the present catalytic articles may include the use of one or more catalyst layers and combinations of one or more catalyst layers. Catalytic materials may be present on the inlet side of the substrate wall alone, the outlet side alone, both the inlet and outlet sides, or the wall itself may consist all, or in part, of the catalytic material. The catalytic coating may be on the substrate wall surfaces and/or in the pores of the substrate walls, that is "in" and/or "on" the substrate walls. Thus, the phrase "a catalytic coating disposed on the substrate" means on any surface, for example on a wall surface and/or on a pore surface. The catalytic coating layer(s) may comprise the individual catalyst compositions (e.g., first and second catalyst compositions) each as described herein.

The coatings are "catalytic coating compositions" or "catalytic coatings." The terms "catalyst composition" and "catalytic coating composition" are synonymous. Coating compositions may be prepared using a binder, for example, a ZrO$_2$ binder derived from a suitable precursor such as zirconyl acetate or any other suitable zirconium precursor, such as zirconyl nitrate. Zirconyl acetate binder provides a coating that remains homogeneous and intact after thermal aging, for example, when the catalyst is exposed to high temperatures of at least about 600° C., for example, about 800° C. and higher water vapor environments of about 5% or more. Other potentially suitable binders include, but are not limited to, alumina and silica. Alumina binders include aluminum oxides, aluminum hydroxides and aluminum oxy-hydroxides. Aluminum salts and colloidal forms of alumina many also be used. Silica binders include various forms of SiO$_2$, including silicates and colloidal silica. Binder compositions may include any combination of zirconia, alumina and silica. Other exemplary binders include boehemite, gamma-alumina, or delta/theta alumina, as well as silica sol. When present, the binder is typically used in an amount of about 1 wt % to about 5 wt % of the total washcoat loading. Alternatively, the binder can be zirconia-based or silica-based, for example zirconium acetate, zirconia sol or silica sol. When present, the alumina binder is typically used in an amount of about 0.05 g/in$^3$ to about 1 g/in$^3$.

A catalyst composition may typically be applied in the form of a washcoat, containing a catalyst composition as disclosed herein. A washcoat is formed by preparing a slurry containing a specified solids content (e.g., from about 10 by weight to about 60% by weight) of a catalyst composition in a liquid vehicle, which is then applied to a substrate and dried and calcined to provide a coating layer. If multiple coating layers are applied, the substrate is dried and calcined after each layer is applied and/or after the number of desired multiple layers are applied. In one or more embodiments, the catalytic material(s) are applied to the substrate as a wash-coat. Binders may also be employed as described above.

The above-noted catalyst composition(s) are generally independently mixed with water to form a slurry for purposes of coating a catalyst substrate, such as a honeycomb-type substrate. In addition to the catalyst particles, the slurry may optionally contain a binder, water-soluble or water-dispersible stabilizers, promoters, associative thickeners, and/or surfactants (including anionic, cationic, non-ionic or amphoteric surfactants). A typical pH range for the slurry is about 3 to about 6. Addition of acidic or basic species to the slurry can be carried out to adjust the pH accordingly. For example, in some embodiments, the pH of the slurry is adjusted by the addition of ammonium hydroxide or aqueous nitric acid.

The slurry can be milled to enhance mixing of the particles and formation of a homogenous material. The milling can be accomplished in a ball mill, continuous mill, or other similar equipment, and the solids content of the slurry may be, e.g., from about 20 wt % to about 60 wt %, for example from about 20 wt % to about 40 wt %. In one embodiment, the post-milling slurry is characterized by a D$_{90}$ particle size from about 10 microns to about 40 microns. In one embodiment, the post-milling slurry is characterized by a D$_{90}$ particle size of from about 10 microns to about 30 microns. In one embodiment, the post-milling slurry is characterized by a D$_{90}$ particle size of from about 10 microns to about 15 microns.

The slurry is then coated on the catalyst substrate using any washcoat technique known in the art. In one embodiment, the catalyst substrate is dipped one or more times in the slurry or otherwise coated with the slurry. Thereafter, the coated substrate is dried at an elevated temperature (e.g., from about 100° C. to about 150° C.) for a period of time (e.g., from about 10 min to about 3 hours) and then calcined by heating, e.g., from about 400° C. to about 600° C., typically for about 10 minutes to about 3 hours. Following drying and calcining, the final washcoat coating layer can be viewed as essentially solvent-free.

After calcining, the catalyst loading obtained by the above described washcoat technique can be determined through calculation of the difference in coated and uncoated weights of the substrate. As will be apparent to those of skill in the art, the catalyst loading can be modified by altering the slurry rheology. In addition, the coating/drying/calcining process to generate a washcoat can be repeated as needed to build the coating to the desired loading level or thickness, meaning more than one washcoat may be applied.

The washcoat(s) can be applied such that different coating layers may be in direct contact with the substrate. Alternatively, one or more "undercoats" may be present, so that at least a portion of a catalytic or sorbent coating layer or coating layers are not in direct contact with the substrate (but rather, are in contact with the undercoat). One or more "overcoats" may also be present, so that at least a portion of the coating layer or layers are not directly exposed to a gaseous stream or atmosphere (but rather, are in contact with the overcoat).

Different coating layers may be in direct contact with each other without a "middle" overlapping zone. Alternatively, different coating layers may not be in direct contact, with a "gap" between the two zones. In the case of an "undercoat" or "overcoat" the gap between the different layers is termed an "interlayer." An undercoat is a layer "under" a coating layer, an overcoat is a layer "over" a coating layer and an interlayer is a layer "between" two coating layers. The interlayer(s), undercoat(s) and overcoat(s) may contain one or more functional compositions or may be free of functional compositions.

The catalytic coating may comprise more than one thin adherent layer, the layers in adherence to each other and the coating in adherence to the substrate. The entire coating comprises the individual "coating layers". The catalytic coating may be "zoned", comprising zoned catalytic layers. This may also be described as "laterally zoned". For example, a layer may extend from the inlet end towards the outlet end extending about 10%, about 20%, about 30%, about 40%, about 50%, about 60%, about 70%, about 80%, or about 90% of the substrate length. Another layer may extend from the outlet end towards the inlet end extending about 10%, about 20%, about 30%, about 40%, about 50%, about 60%, about 70%, about 80%, or about 90% of the substrate length. Different coating layers may be adjacent to each other and not overlay each other. Alternatively, different layers may overlay a portion of each other, providing a third "middle" zone. The middle zone may, for example, extend from about 5% to about 80% of the substrate length, for example about 5%, about 10%, about 20%, about 30%, about 40%, about 50%, about 60% or about 70% of the substrate length.

Different layers may each extend the entire length of the substrate or may each extend a portion of the length of the substrate and may overlay or underlay each other, either partially or entirely. Each of the different layers may extend from either the inlet end or outlet end.

Zones, where present on the catalytic article in certain embodiments of the present disclosure, are defined by the relationship of coating layers. With respect to different coating layers, there are a number of possible zoning configurations. For example, there may be an upstream zone and a downstream zone, there may be an upstream zone, a middle zone and a downstream zone, there may four different zones, etc. Where two layers are adjacent and do not overlap, there are upstream and downstream zones. Where two layers overlap to a certain degree, there are upstream, downstream and middle zones. Where for example, a coating layer extends the entire length of the substrate and a different coating layer extends from the outlet end a certain length and overlays a portion of the first coating layer, there are upstream and downstream zones. The present catalytic coatings may comprise more than one identical layer.

Figure 3A:
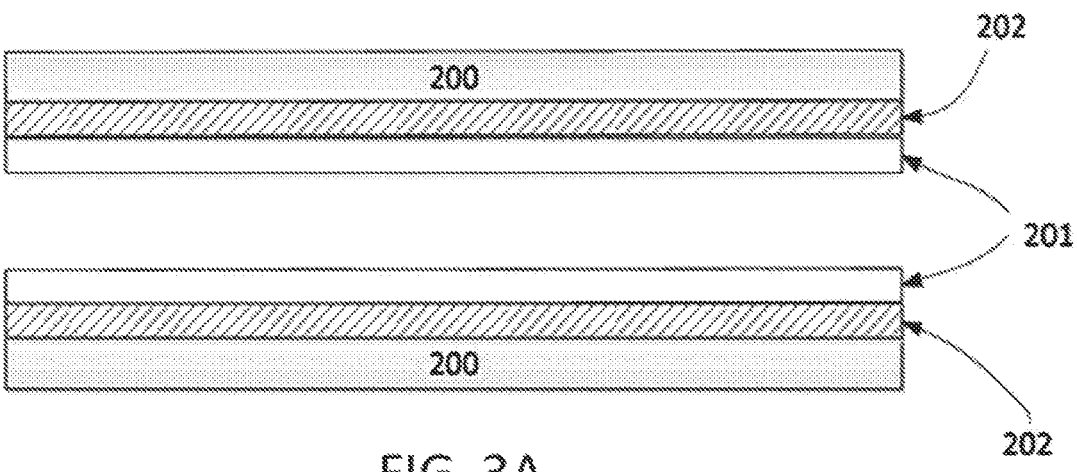
FIGS. 3A, 3B, and 3C are non-limiting illustrations of possible coating configurations.
Figure 3B:
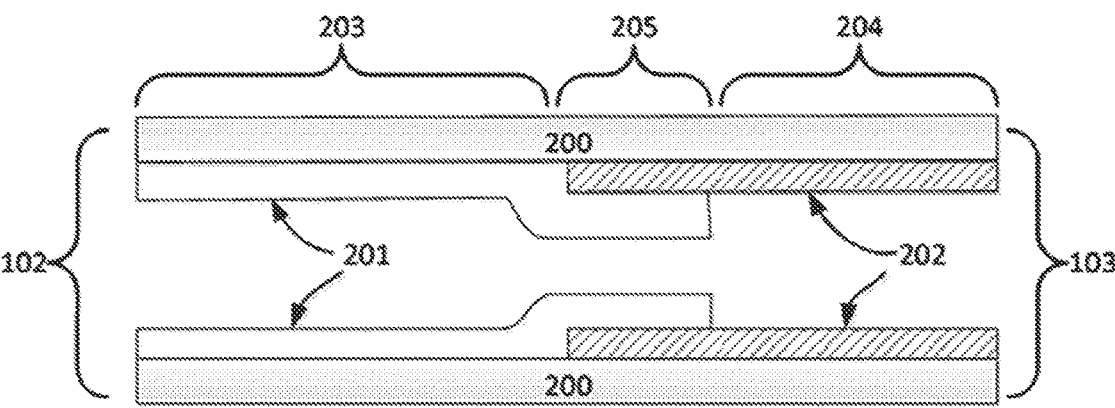
Figure 3C:
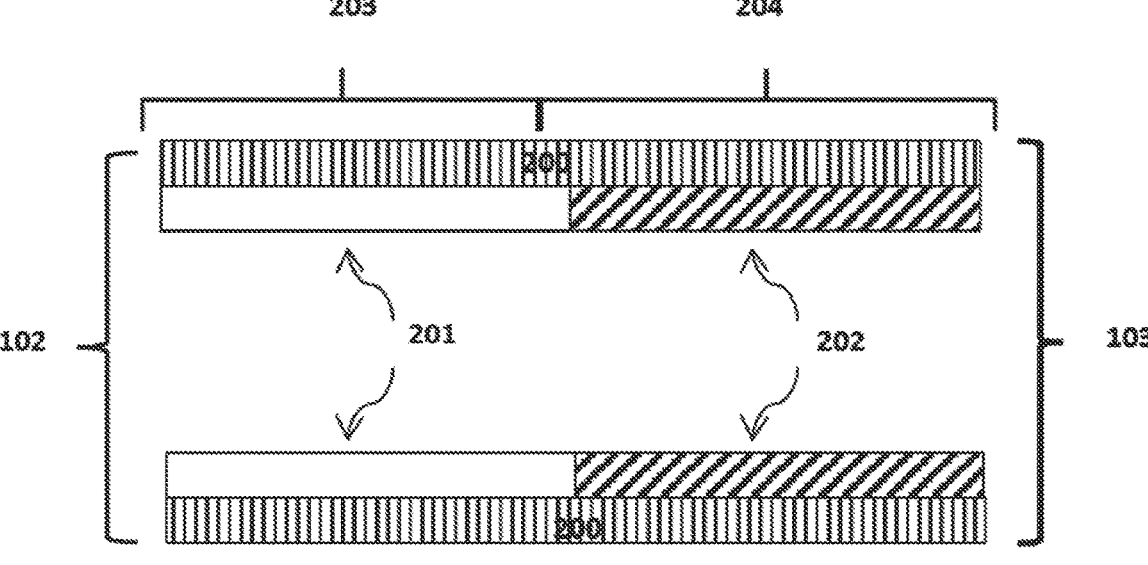

FIGS. 3A, 3B and 3C show some possible coating layer configurations with two coating layers. Shown are monolithic wall-flow filter substrate walls 200 onto which coating layers 201 and 202 are disposed. This is a simplified illustration, and in the case of a porous wall-flow substrate, not shown are pores and coatings in adherence to pore walls and not shown are plugged ends. In FIG. 3A, coating layers 201 and 202 each extend the entire length of the substrate with layer 201 overlaying layer 202. The substrate of FIG. 3A does not contain a zoned coating configuration. In FIG. 3B, coating layer 202 extends from the outlet end about 50% of the substrate length and layer 201 extends from the inlet end greater than 50% of the length and overlays a portion of layer 202, providing an upstream zone 203, a middle zone 205 and a downstream zone 204. In FIG. 3C, coating layer 201 extends from the inlet end to the outlet end about 50% of the substrate length; and coating layer 202 extends from the outlet end to the inlet end about 50% of the substrate length and the coating layers are adjacent each other, providing an inlet upstream zone 203 and an outlet downstream zone 204. FIGS. 3A, 3B and 3C may be useful to illustrate coating compositions on the wall-through substrate. FIGS. 3A, 3B and 3C may further be useful to illustrate coating compositions on the flow-through substrate, as described herein below. Configurations of such coating layers are not limited.

In some embodiments, the first catalyst composition is disposed on the substrate in the form of a washcoat, forming a first layer, and the second catalyst composition is disposed on the first catalyst composition layer in the form of a washcoat, forming a second (top) layer.

II. Exhaust Gas Treatment Systems

Source of Hydrogen Gas (H₂)

The exhaust gas treatment system as disclosed herein comprises a source of hydrogen gas ($H_2$). In some embodiments, the source of $H_2$ is an on-board storage vessel, such as a compressed $H_2$ tank. Hydrogen may be stored in a gaseous, liquid or solid state. Hydrogen may be stored for instance in a solid state, for example in silicon or a hydrogen storage alloy. Solid state hydrogen storage is taught for example in US Patent Application Publication Nos. 2004/0241507, 2008/0003470, 2008/0274873, 2010/0024542, and 2011/0236790, each of which is incorporated by reference herein in their entirety. Hydrogen storage alloys reversibly store hydrogen and are disclosed for example in U.S. Pat. Nos. 5,407,761 and 6,193,929, and US Patent Application Publication No. 2016/0230255, each of which is incorporated by reference herein in their entirety. Hydrogen storage alloys are for example modified $AB_x$ type metal hydride (MH) alloys where in general, A is a hydride forming element and B is a weak or non-hydride forming element. A is in general a larger metallic atom with about 4 or less valence electrons and B is in general a smaller metallic atom with about 5 or more valence electrons. Suitable $AB_x$ alloys include those where x is from about 0.5 to about 5. The present alloys are capable of reversibly absorbing (charging) and desorbing (discharging) hydrogen. $AB_x$ type alloys are for example of the categories (with simple examples), AB (HfNi, TiFe, TiNi), $AB_2$ ($ZrMn_2$, $TiFe_2$), $A_2B$ ($Hf_2Fe$, $Mg_2Ni$), $AB_3$ ($NdCo_3$, $GdFe_3$), $A_2B_7$ ($Pr_2Ni_7$, $Ce_2Co_7$), and $AB_5$ ($LaNi_5$, $CeNi_5$).

In other embodiments, the source of $H_2$ is an on-board $H_2$ generator. In such embodiments, exhaust gas treatment systems comprise or are associated with an on-board $H_2$ generator which may comprise an alcohol reformer, an ammonia decomposition apparatus, an electrolysis apparatus, a fuel reformer, an exhaust gas reformer, or a combination thereof. In such embodiments, the $H_2$ may be generated on demand, or generated and subsequently stored, e.g., in an on-board storage vessel.

In some embodiments, the on-board $H_2$ generator comprises a water-splitting article or an ammonia decomposition article configured to generate hydrogen. The water-splitting article may comprise an electrolytic cell configured to split water into hydrogen and oxygen via an electrochemical reaction. For instance, the water-splitting article may comprise a photoelectrode configured to initiate the electrochemical reaction. A photoelectrode is associated with a light source. In some embodiments, the light source is a light emitting diode (LED), for example a blue light emitting diode. The light source may be associated with a battery. The battery is for example a main rechargeable vehicle battery. Devices for hydrogen generation are disclosed for example in US Patent Application Publication Nos. 2007/0246351 and 2008/0257751, each of which is incorporated by reference herein in their entirety.

In some embodiments, the on-board hydrogen generator may comprise a catalytic article (catalytic reactor") configured to decompose ammonia into nitrogen and hydrogen (ammonia decomposition article). The source of ammonia may be from an on-board ammonia reservoir or may be from ammonia brought on-board, for example in a tank adapted to contain gaseous or liquid ammonia (and adapted to release ammonia as needed). For instance, the system may comprise a tank adapted to contain ammonia and release ammonia (ammonia storage tank) and a catalytic reactor configured to decompose ammonia into hydrogen and nitrogen. For example, the system may comprise an ammonia generation system and a catalytic reactor configured to decompose ammonia to hydrogen and nitrogen. Suitable systems for generating and storing hydrogen are disclosed in, for example, US Patent Application Publication Nos. 2020/0102871, 2020/0032689, 2020/0032688, and 2020/0032686; and in International Patent Application Publication Nos. WO2018185665 and WO2018185655; all to BASF Corp. and each of which is incorporated by reference herein in its entirety.

In some embodiments, the on-board hydrogen generator may comprise a catalytic article ("catalytic reformer") configured to decompose hot exhaust gas components (e.g., unburned hydrocarbon fuel) into carbon monoxide and hydrogen via oxidation over certain metal oxide catalysts. In such embodiments, the catalytic reformer is located upstream from the TWC catalyst article and in fluid communication with the exhaust gas stream.

In some embodiments, the on-board hydrogen generator comprises at least one $H_2$ generating component comprising a dopant comprising nanoparticles of aluminum, nanoparticles of aluminum-nickel, nanoparticles of aluminum/silica, nanoparticles of aluminum/cobalt, nanoparticles of aluminum/magnesium, nanoparticles of alumina, nanoparticles of magnesium, nanoparticles of magnesium-nickel, nanoparticles of zinc, sodium borohydride, or a combination thereof, and wherein the at least one $H_2$ generating component added to a gasoline fuel prior to combustion of said fuel in the gasoline engine.

Such nanoparticles, when mixed with fuel and subjected to combustion in the combustion chamber of a gasoline internal combustion engine, produce hydrogen in excess of the normal small amounts produced in the absence of such particles. In some embodiments, the at least one $H_2$ generating component is added to the gasoline on board the vehicle. In some embodiments, the at least one $H_2$ generating component is added to the gasoline externally to the vehicle.

$H_2$ Injection Article

In some embodiments, the exhaust gas treatment system as disclosed herein comprises a $H_2$ injection article, for instance a valve, in fluid communication with the $H_2$ source and configured to prevent the exhaust gas stream from entering the $H_2$ source, and configured to introduce $H_2$ into the exhaust gas stream. $H_2$ may be "pulsed" or released intermittently into the exhaust gas stream to perform the desired reducing function upon demand (on-demand). The $H_2$ injection article is in fluid communication with the TWC catalyst article and configured to introduce $H_2$ into the exhaust gas stream upstream of the TWC catalyst article. The $H_2$ injection article will typically be downstream of and in fluid communication with an internal combustion engine, and in communication with one or more of a feedback sensor and a control unit. In some embodiments, the $H_2$ injection article is located upstream from the TWC catalyst article, upstream from a feedback sensor, in fluid communication with an exhaust gas stream and with an $H_2$ source, and in communication with a control unit, and is configured to introduce $H_2$ from the $H_2$ source into the exhaust gas stream upstream of the TWC catalyst article.

Feedback Sensor

The introduction (e.g., injection) of $H_2$ into the exhaust gas stream is controlled in order to keep the concentration of $H_2$ in the exhaust gas stream below the flammability limit. The concentration of $H_2$ can be controlled by monitoring the $H_2$ concentration in the exhaust gas stream and adjusting the introduction of $H_2$ accordingly (i.e., modulating the $H_2$ introduction), for example, direct measurement via an appropriate method, such as mass-spectrometry, previously determined pre-set values, or by surrogate measures using a sensor. Although direct measurement using mass-spectrometry is well-established, its use on-board of a passenger vehicle is impractical due to additional space requirements, high-cost of the system, increased noise level, complexity in servicing, etc. The utilization of pre-set values would be based on calculating desired $H_2$ flow based on a previously measured set of parameters (concentration of different species, flow rate, etc.). This requires that vehicle operates exactly the same way every time, and may prove inaccurate under many circumstances (difference in external temperature, air humidity, age of the engine, etc.). Typically, the simplest, most cost effective and reliable method is the use of a sensor.

Accordingly, in some embodiments, the exhaust gas treatment system as disclosed herein comprises a feedback sensor. The feedback sensor may be an oxygen sensor, such as a wide-band oxygen sensor (UEGO). The use of an $O_2$ sensor (for example, wide-band UEGO) has proven to be a reliable method to approximate the sum composition of exhaust gas with respect to its oxidative (lean mixture) and reductive (rich mixture) nature. The injection of $H_2$ into the exhaust will directly influence the reading of an $O_2$-sensor, generating a rich shift ($\lambda$<1). Several well-established formulae (see, for example, Brettschneider, J. (1997), SAE Technical Papers 972989) can be used to calculate the air-to-fuel ratio ($\lambda$) for a given exhaust gas composition. Therefore, one can easily correlate the concentration of oxidants and reductants (specifically $H_2$) in the exhaust to the reading of the $O_2$-sensor.

In some embodiments, the exhaust gas treatment system further comprises a temperature sensor for detecting a temperature of the exhaust gas stream, for example, a thermocouple, located upstream from the catalytic article and in contact with the exhaust gas stream, located within the catalytic article and in contact with the exhaust gas stream, or both.

In some embodiments, the feedback sensor and/or the temperature sensor are in communication with a control unit. In such embodiments, a signal from the feedback sensor, the temperature sensor, or both, are fed to the control unit in order to modulate the introduction of $H_2$ into the exhaust gas stream.

Control Unit

The exhaust gas treatment system may be integrated into the engine electronic management algorithm (electronic management system or electronic control unit (ECU)). For example, the feedback sensor and temperature sensor may provide a signal to the control unit, which then adjusts one or more of $H_2$ introduction, $H_2$ generation, and engine parameters such as air-to-fuel ratio. In some embodiments, the control unit communicates with (i.e., provides a signal to) the $H_2$ injection article, causing a valve to open or close, allowing $H_2$ introduction to start or stop, respectively.

The control unit continually or periodically monitors numerous parameters and performs numerous calculations. Some of these relate to the air-fuel ratio. For example, the vehicle manufacturer defines two control parameters: a pre-defined value of air-to-fuel ratio, designated $\lambda°$, and a running average air-to-fuel ratio, designated J. The former parameter ($\lambda°$) can be obtained, but is not limited to, through mathematical modelling, experimental measurements, auto-generated as a result of readings by the vehicle Electronic Control Unit (ECU), etc. The latter parameter ($\overline{\lambda}$), is calculated by dividing the sum of all air-to-fuel ratio measurements $$\sum_{i=1}^{N} \lambda_i$$

generated for a given length of time by the number of measurements (N) comprised in this length of time, according to the formula:

$$\overline{\lambda} = \frac{\sum_{i=1}^{N} \lambda_i}{N}$$

where $\lambda_i$ is the air-to-fuel ratio at each point. The difference between $\overline{\lambda}$ and $\lambda°$, is designated $\Delta\lambda$, and is calculated by the Control Unit, according to the formula shown below.

$$\Delta\lambda = \overline{\lambda} - \lambda°;$$

It is understood that, for a typical gasoline engine, a $\Delta\lambda$ of about −0.345 corresponds to about 20% by volume of $H_2$ in the exhaust gas, a $\Delta\lambda$ of about −0.060 corresponds to about 2% by volume of $H_2$ in the exhaust gas, and a $\Delta\lambda$ of about −0.014 corresponds to about 0.5% by volume of $H_2$ in the exhaust gas. Accordingly, the $\Delta\lambda$ value can be calculated by the ECU using data from the feedback sensor, and used as a surrogate measure of $H_2$ concentration. Accordingly, the ECU may be used to modulate $H_2$ introduction to provide a specific concentration of $H_2$ in the exhaust gas stream.

Figure 4:
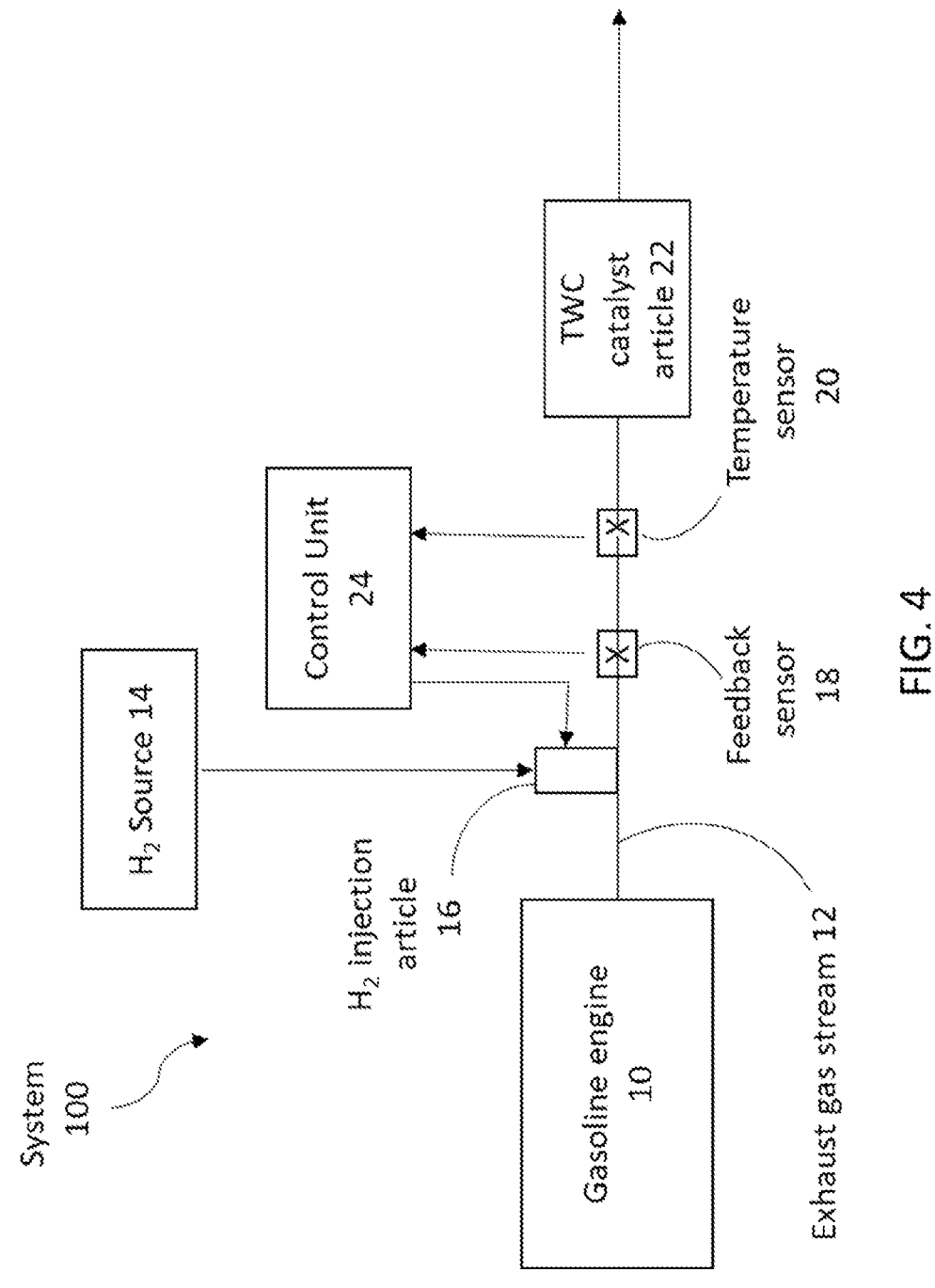
FIG. 4 is a schematic depiction of an embodiment of an emission treatment system in accordance with the present disclosure.
Figure 5:
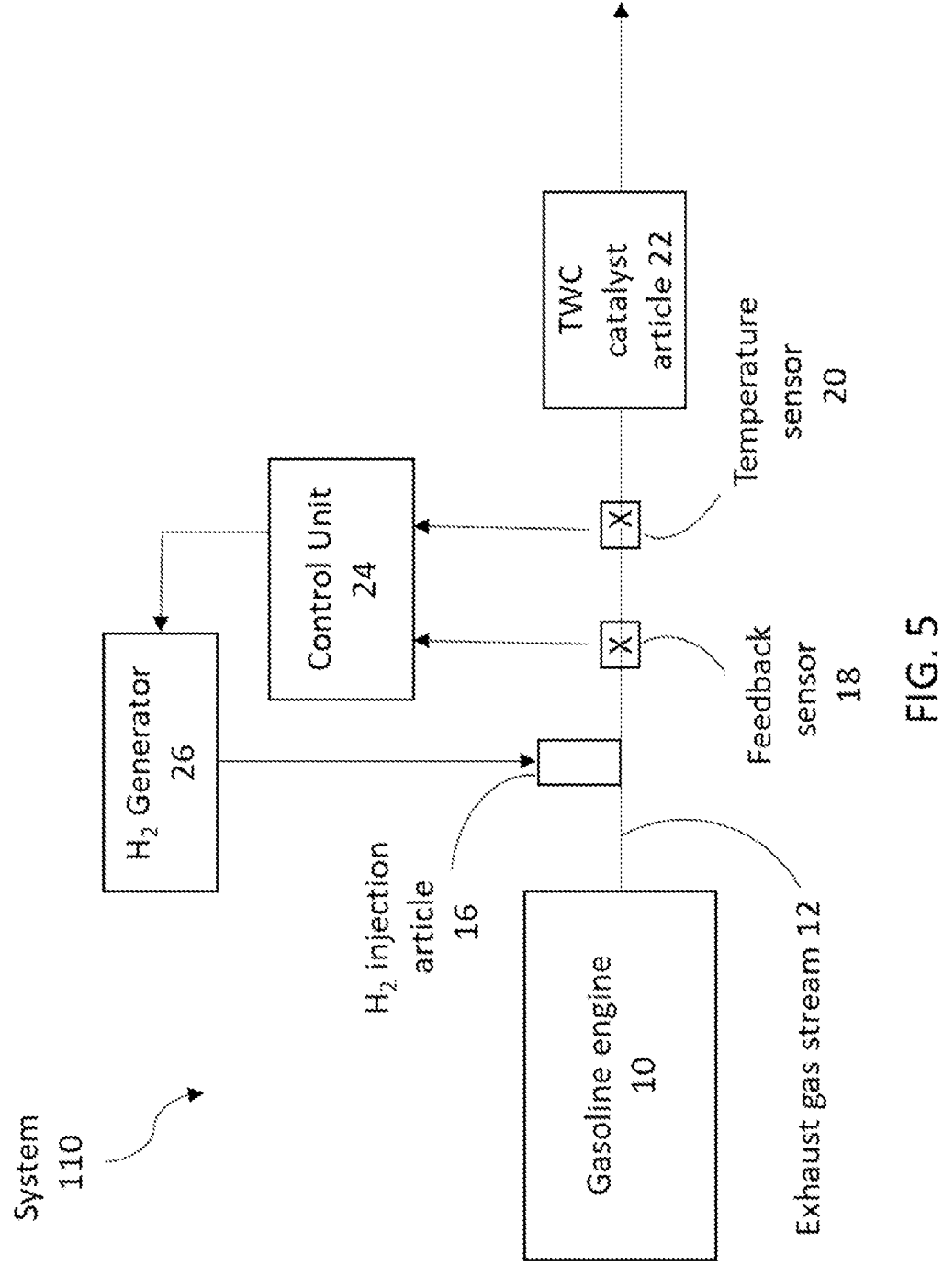
FIG. 5 is a schematic depiction of another embodiment of an emission treatment system in accordance with the present disclosure.
Figure 6:
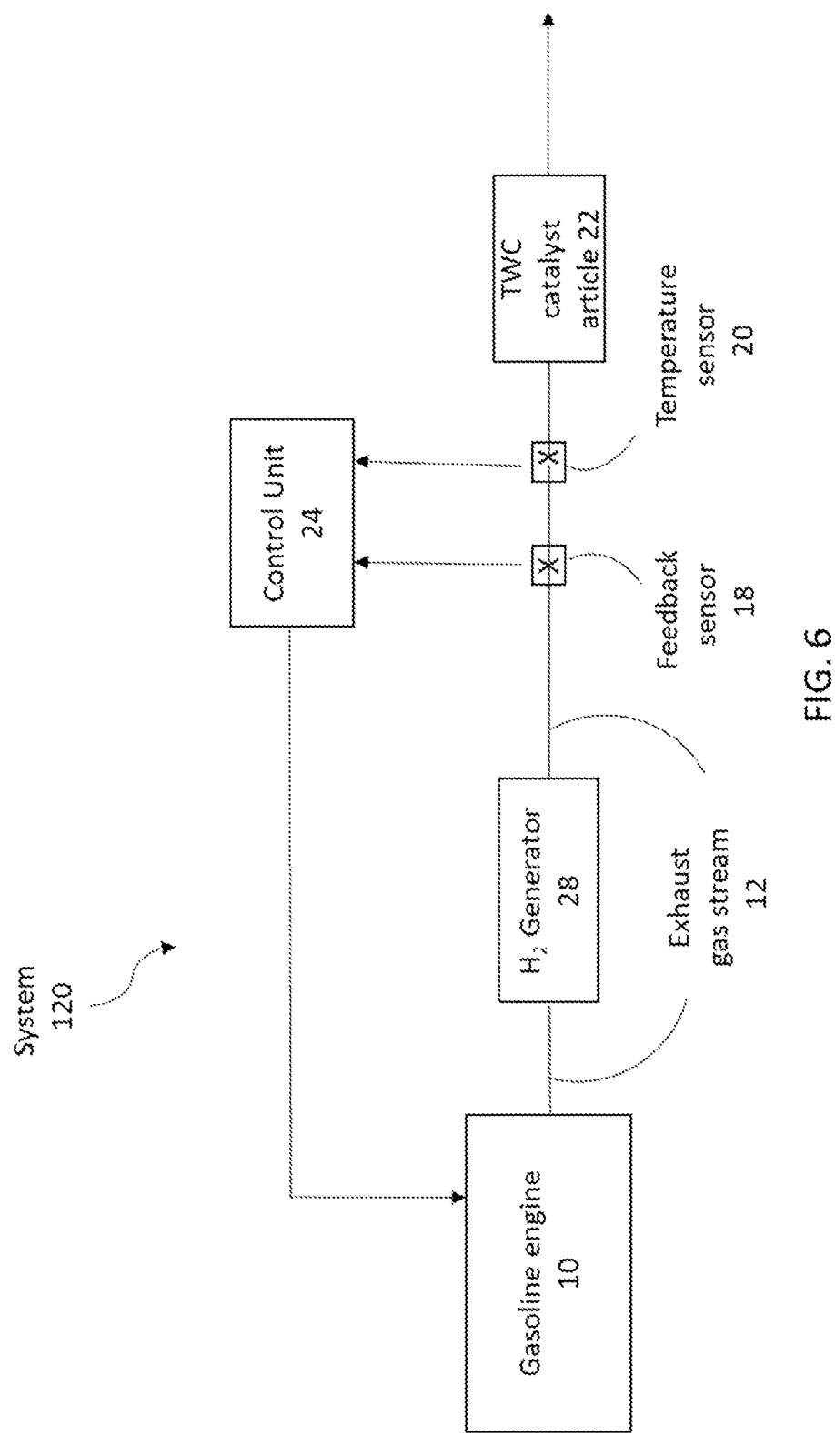
FIG. 6 is a schematic depiction of yet another embodiment of an emission treatment system in accordance with the present disclosure.
Figure 7:
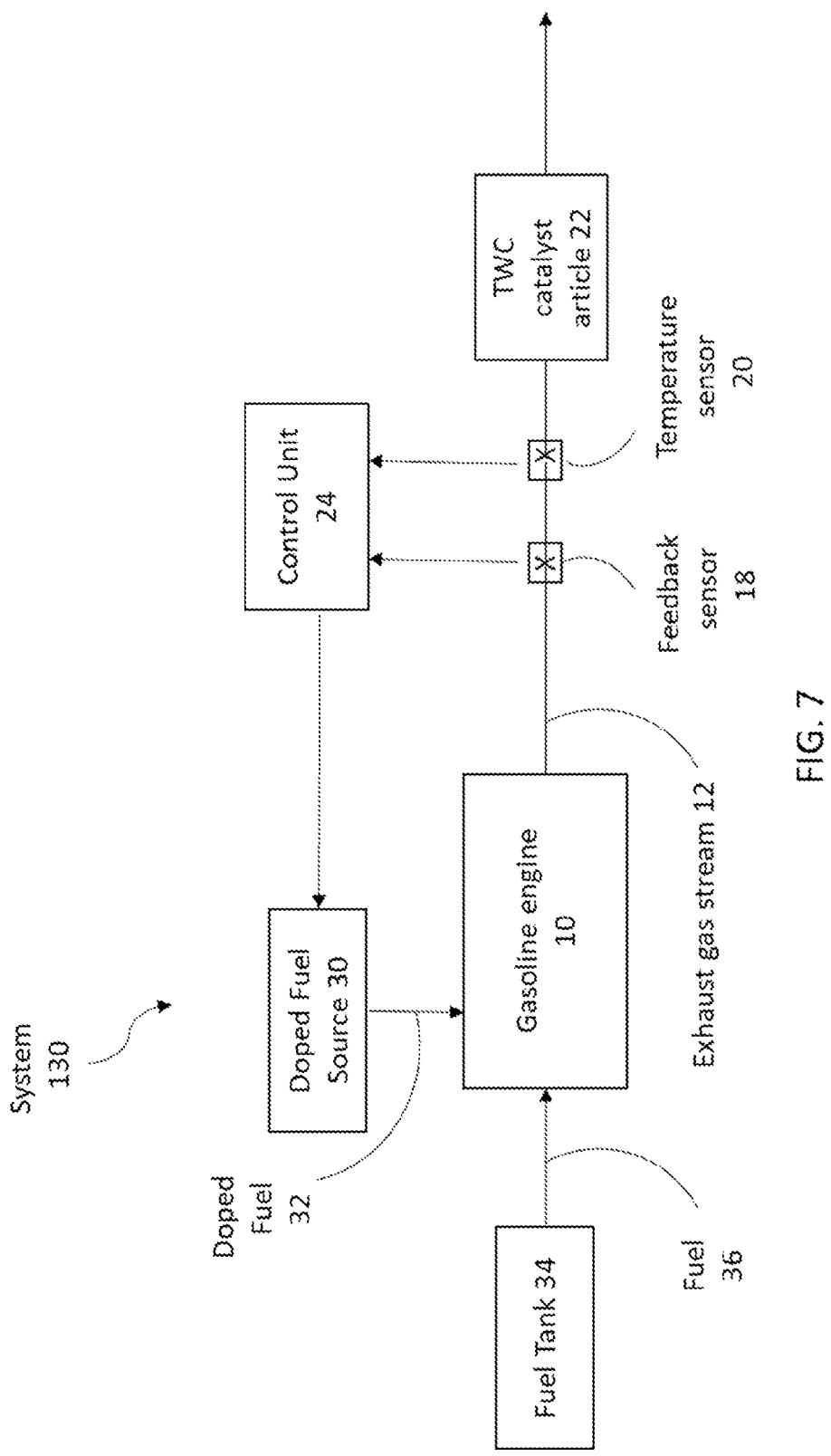
FIG. 7 is a schematic depiction of a further embodiment of an emission treatment system in accordance with the present disclosure.
Figure 8:
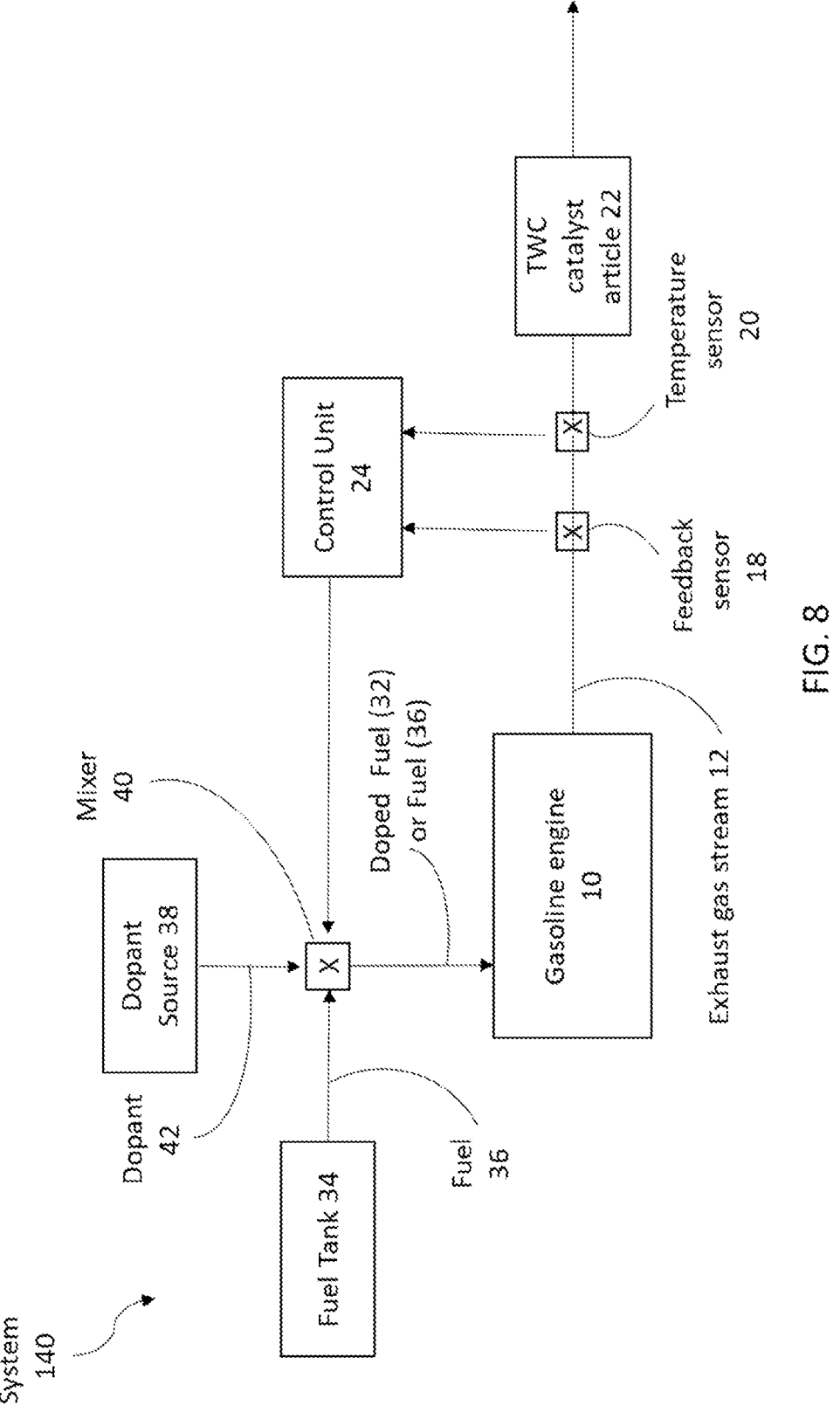
FIG. 8 is a schematic depiction of a still further embodiment of an emission treatment system in accordance with the present disclosure.

The exhaust gas treatment system as disclosed herein may be appreciated by reference to FIGS. 4-8, which illustrate various non-limiting embodiments. With reference to FIG. 4, in one illustrative embodiment, the exhaust gas treatment system (100) comprises an internal combustion gasoline engine (10), producing an exhaust gas stream (12) comprising carbon monoxide (CO), a TWC catalyst article (22), a feedback sensor (18), a control unit (24), and a $H_2$ source (14). System 100 further comprises a $H_2$ injection article (16) and a temperature sensor (20). The location of the temperature sensor 20 may vary, for example, it may be within the catalyst article 22, upstream of the catalyst article 22, or both. The TWC catalyst article 22 is located downstream of and in fluid communication with the gasoline engine 10. The feedback sensor 18 is located upstream from the catalyst article 22 and in contact with the exhaust gas stream 12. The control unit 24 is in communication with the feedback sensor 18, the temperature sensor 20, and the $H_2$ injection article 16. The system is configured to introduce $H_2$ from the $H_2$ source 14 into the exhaust gas stream 12 upstream of the catalyst article 22 during a cold-start period. The feedback sensor 18 is configured to provide a concentration of $H_2$ in the exhaust gas stream 12 by modulating the $H_2$ introduction via the control unit 24 and the $H_2$ injection article 16.

In another illustrative embodiment (FIG. 5), the exhaust gas treatment system (110) comprises an internal combustion gasoline engine (10), producing an exhaust gas stream (12) comprising carbon monoxide (CO), a TWC catalyst article (22), a feedback sensor (18), a control unit (24), and a $H_2$ generator (26). System 110 further comprises a $H_2$ injection article (16) and a temperature sensor (20). The location of the temperature sensor 20 may vary, for example, it may be within the catalyst article 22, upstream of the catalyst article 22, or both. The catalyst article 22, for example a TWC catalyst article, is located downstream of and in fluid communication with the gasoline engine 10. The feedback sensor 18 is located upstream from the catalyst article 22 and in contact with the exhaust gas stream 12. The control unit 24 is in communication with the feedback sensor 18, the temperature sensor 20, and the $H_2$ generator 26. The system is configured to introduce $H_2$ from the $H_2$ generator 26 into the exhaust gas stream 12 upstream of the catalyst article 22 during a cold-start period. The feedback sensor 18 is configured to provide a concentration of $H_2$ in the exhaust gas stream 12 by modulating the $H_2$ introduction via the control unit 24 and the $H_2$ generator 26.

In yet another illustrative embodiment (FIG. 6), the exhaust gas treatment system (120) comprises an internal combustion gasoline engine (10), producing an exhaust gas stream (12) comprising carbon monoxide (CO), a TWC catalyst article (22), a feedback sensor (18), a temperature sensor (20) and a control unit (24). The location of the temperature sensor 20 may vary, for example, it may be within the catalyst article 22, upstream of the catalyst article 22, or both. System 120 further comprises a $H_2$ generator 28, located downstream of and in fluid communication with the gasoline engine 10. The TWC catalyst article 22 is located downstream of and in fluid communication with the gasoline engine 10 and the $H_2$ generator 28. The feedback sensor 18 is located upstream from the catalyst article 22 and in contact with the exhaust gas stream 12, and downstream of the $H_2$ generator 28. The system is configured to introduce $H_2$ from the $H_2$ generator 28 into the exhaust gas stream 12 upstream of the TWC catalyst article 22 during a cold-start period. The feedback sensor 18 is configured to provide a ratio by volume of CO to $H_2$ in the exhaust gas stream 12 by modulating the $H_2$ introduction via the control unit 24. The control unit 24 is in communication with the feedback sensor 18, the temperature sensor 20, and the engine 10.

The $H_2$ generator is a catalytic reformer which catalyzes an in situ process of generating additional hydrogen from the components of the exhaust gas, upon contacting exhaust gas with the catalytic reformer. The system is configured to introduce $H_2$ from the $H_2$ generator 28 into the exhaust gas stream 12 upstream of the TWC catalyst article 22 during a cold-start period. Using a signal from the control unit (24), the internal combustion engine (10) functions in a regime favoring the introduction (i.e., creation of) hydrogen in the exhaust gas stream by e.g., decreasing the air-fuel ratio such that additional CO and/or HC are available for catalytic reformation to $H_2$ in generator 28.

In yet another illustrative embodiment (FIG. 7), the exhaust gas treatment system (130) comprises an internal combustion gasoline engine (10), producing an exhaust gas stream (12) comprising carbon monoxide (CO), a TWC catalyst article (22), a feedback sensor (18), a temperature sensor (20), and a control unit (24). The location of the temperature sensor 20 may vary, for example, it may be within the catalyst article 22, upstream of the catalyst article 22, or both. System 130 further comprises a fuel tank (34), containing fuel (36) and a doped fuel source (30) containing doped fuel (32). The doped fuel source 30 provides doped fuel 32 to the internal combustion engine 10 to facilitate an in situ process of generating additional hydrogen upon combustion. The doped fuel 32 comprises fuel 36 and at least one component selected from nanoparticles of aluminum, nanoparticles of aluminum-nickel, nanoparticles of aluminum/silica, nanoparticles of aluminum/cobalt, nanoparticles of aluminum/magnesium, nanoparticles of alumina, nanoparticles of magnesium, nanoparticles of magnesium-nickel, nanoparticles of zinc, sodium borohydride, or a combination thereof. Such components, under combustion conditions, produce an exhaust gas stream enriched in $H_2$. The doped fuel source 30 may comprise, for example, a storage vessel containing the doped fuel 32, and may further comprise such articles as valves, mixers, pumps, metering devices, and the like, and is configured to convey the doped fuel 32 to the engine 10. In such embodiments, the dopant is generally mixed with the fuel externally to the vehicle, prior to adding doped fuel to the doped fuel source 30.

The control unit 24 is in communication with feedback sensor 18, temperature sensor 20, and the doped fuel source 30. The location of the temperature sensor 20 may vary, for example, it may be within the catalyst article 22, upstream of the catalyst article 22, or both. Using a signal from the control unit 24, the doped fuel source introduces doped fuel 32 into the engine prior to combustion during a cold-start period. The feedback sensor 18 is configured to provide a ratio by volume of CO to $H_2$ in the exhaust gas stream 12 by modulating the $H_2$ introduction via the control unit 24 and doped fuel source 30.

In yet another illustrative embodiment (FIG. 8), the exhaust gas treatment system (140) comprises an internal combustion gasoline engine (10), producing an exhaust gas stream (12) comprising carbon monoxide (CO), a TWC catalyst article (22), a feedback sensor (18), a temperature sensor (20), and a control unit (24). The location of the temperature sensor 20 may vary, for example, it may be within the catalyst article 22, upstream of the catalyst article 22, or both. System 140 further comprises a fuel tank (34), containing fuel (36), a mixer (40), and a dopant source (38) containing a dopant (42) comprising at least one component selected from ceria nanoparticles, ceria-zirconia nanoparticles, and a combination thereof. Such components, under combustion conditions, produce an exhaust gas stream enriched in $H_2$. The mixer 40 may comprise, for example, such articles as valves, pumps, metering devices, and the like, and is configured to convey the doped fuel 32 and/or fuel 36 to the engine 10.

The dopant source 38 provides dopant 42 to the internal combustion engine 10 by way of mixer 40 to facilitate an in situ process of generating additional hydrogen upon combustion. In this embodiment, the mixer 40 mixes fuel 36 with dopant 42, and provides the doped fuel 32 to engine 10 during a cold-start period. The mixer 40 delivers fuel 36 without dopant at other times (e.g., during normal operation). The feedback sensor 18 is configured to provide a concentration of $H_2$ in the exhaust gas stream 12 by modulating the $H_2$ introduction via the control unit 24, fuel 36, dopant 42, and mixer 40.

In each of the exhaust gas treatment system embodiments disclosed herein, the exhaust gas treatment system is configured to introduce the $H_2$ concentration in the exhaust gas stream 12, and to provide a concentration of $H_2$ in the exhaust gas stream. The $H_2$ introduction generally occurs during about the first 200 s from start of the engine 10 (i.e., the cold-start period), upon a signal from the control unit 24. In some embodiments, $H_2$ introduction may occur during other times to promote the catalyst article 22, for example, during periods of low temperature operation such as extended idling or low speed driving. The introduction of $H_2$ is modulated to provide a $\Delta\lambda$ (determined by the feedback sensor 18 in communication with control unit 24) value of about −0.345, or about −0.060, or about −0.014, when the temperature of the exhaust gas stream 12 is in the range of about 90° C. to about 550° C. as measured by temperature sensor 20. In some embodiments, introduction of $H_2$ is modulated when the temperature of the exhaust gas stream 12 is in the range of about 90° C. to about 190° C.

In some embodiments, the exhaust gas stream 12 contains no greater than about 20 vol. % of $H_2$. In one embodiment, the exhaust gas stream contains no greater than about 18 vol % of $H_2$. In one embodiment, the exhaust gas stream contains no greater than about 16 vol % of $H_2$. In one embodiment, the exhaust gas stream contains no greater than about 14 vol % of $H_2$. In one embodiment, the exhaust gas stream contains no greater than about 12 vol % of $H_2$. In one embodiment, the exhaust gas stream contains no greater than about 10 vol % of $H_2$. In one embodiment, the exhaust gas stream contains no greater than about 8 vol % of $H_2$. In one embodiment, the exhaust gas stream contains no greater than about 6 vol % of $H_2$. In one embodiment, the exhaust gas stream contains no greater than about 4 vol % of $H_2$. In some embodiments, the exhaust gas stream 12 contains no greater than about 2 vol. % of $H_2$. In one embodiment, the exhaust gas stream contains no greater than about 1 vol % of $H_2$. In some embodiments, the exhaust gas stream 12 contains no greater than about 0.5 vol. % of $H_2$.

III. Method of Treating Engine Exhaust

In another aspect is provided a method of treating an exhaust gas stream from a gasoline engine, the method comprising contacting the exhaust gas stream with a TWC catalyst article located downstream of the gasoline engine and in fluid communication with the exhaust gas stream; introducing hydrogen gas ($H_2$) from a $H_2$ source into the exhaust gas stream upstream of the TWC catalyst article; and controlling a concentration by volume of $H_2$ in the exhaust gas stream upstream from the TWC catalyst article, wherein controlling the concentration by volume of $H_2$ comprises modulating the $H_2$ introduction.

In some embodiments, controlling a concentration by volume of $H_2$ comprises introducing $H_2$ into the exhaust gas stream when a temperature of the exhaust gas stream upstream from or inside the TWC catalyst article is in a range from about 90° C. to about 550° C. In some embodiments, controlling a concentration by volume of $H_2$ comprises introducing $H_2$ into the exhaust gas stream when a temperature of the exhaust gas stream upstream from or inside the TWC catalyst article is in a range from about 90° C. to about 190° C.

In some embodiments, the $H_2$ is introduced for about 200 seconds.

In some embodiments, modulating the $H_2$ introduction comprises: obtaining a signal from a feedback sensor and/or a temperature sensor, the feedback sensor located upstream from the TWC catalyst article, and the temperature sensor located upstream from or inside the TWC catalyst article, both sensors in contact with the exhaust gas stream; and controlling a quantity of $H_2$ introduced using said signal.

In some embodiments, the exhaust gas stream contains no greater than about 20 vol. % of $H_2$. In one embodiment, the exhaust gas stream contains no greater than about 18 vol % of $H_2$. In one embodiment, the exhaust gas stream contains no greater than about 16 vol % of $H_2$. In one embodiment, the exhaust gas stream contains no greater than about 14 vol % of $H_2$. In one embodiment, the exhaust gas stream contains no greater than about 12 vol % of $H_2$. In one embodiment, the exhaust gas stream contains no greater than about 10 vol % of $H_2$. In one embodiment, the exhaust gas stream contains no greater than about 8 vol % of $H_2$. In one embodiment, the exhaust gas stream contains no greater than about 6 vol % of $H_2$. In one embodiment, the exhaust gas stream contains no greater than about 4 vol % of $H_2$. In some embodiments, the exhaust gas stream contains no greater than about 2 vol. % of $H_2$. In one embodiment, the exhaust gas stream contains no greater than about 1 vol % of $H_2$. In some embodiments, the exhaust gas stream contains no greater than about 0.5 vol. % of $H_2$.

In some embodiments, the method comprises introducing $H_2$ into the exhaust gas stream; and providing a $\Delta\lambda$ value of from about −0.014 to about −0.345 for a period of time. In some embodiments, the period of time is about 200 seconds. In some embodiments, $\Delta\lambda$ is about −0.345. In some embodiments, $\Delta\lambda$ is about −0.060. In some embodiments, $\Delta\lambda$ is about −0.014.

According to the present disclosure, it has been found that introducing quantities of $H_2$ in the afore-mentioned volume % ranges, or to provide the range of $\Delta\lambda$ values as disclosed herein above, can, in some embodiments, enhance downstream TWC catalyst activity and reduce hydrocarbon (HC) and nitrogen oxide ($NO_x$) emissions. In some embodiments, $NO_x$ conversion may be improved by introduction of $H_2$ without adversely affecting HC and CO conversion. Such methods may be useful in controlling emissions (e.g., $NO_x$) during the cold-start period when the downstream TWC catalyst article has not yet reached a temperature at which conversion of emission components is efficient. Without wishing to be bound by theory, it is believed that increasing the $H_2$ concentration may, for example, regenerate catalyst PGMs, and/or may minimize nitrate formation which would otherwise inhibit the PGMs from dissociating the molecular oxygen needed for low temperature oxidation.

In some embodiments, introducing $H_2$ further comprises generating $H_2$ during the combustion of gasoline in the gasoline engine, wherein generating $H_2$ comprises adding at least one $H_2$ generating component to the gasoline prior to combustion. In some embodiments, the at least one $H_2$ generating component comprises a dopant comprising nanoparticles of aluminum, nanoparticles of aluminum-nickel, nanoparticles of aluminum/silica, nanoparticles of aluminum/cobalt, nanoparticles of aluminum/magnesium, nanoparticles of alumina, nanoparticles of magnesium, nanoparticles of magnesium-nickel, nanoparticles of zinc, sodium borohydride, or a combination thereof. In some embodiments, the at least one $H_2$ generating component is added to the gasoline on board the vehicle. In some embodiments, the at least one $H_2$ generating component is added to the gasoline externally to the vehicle.

In other embodiments, introducing $H_2$ further comprises generating $H_2$ wherein generating $H_2$ comprises contacting the exhaust gas stream with an exhaust gas reforming catalyst.

In a further aspect is provided a method for reducing a level of one or more of hydrocarbons, carbon monoxide, nitrogen oxide, and particulate matter in a gaseous exhaust stream from a gasoline engine, the method comprising contacting the gaseous exhaust stream with the exhaust gas treatment system as disclosed herein.

IV. Method of Enhancing the Cold-Start Catalytic Performance of a Platinum-Containing TWC Catalyst Article In a further aspect is provided a method of enhancing the cold-start catalytic performance of a platinum-containing TWC catalyst article as disclosed herein. The method comprises contacting the exhaust gas stream with the platinum-containing TWC catalyst article, wherein the platinum-containing TWC catalyst article is positioned downstream of the gasoline engine and in fluid communication with the exhaust gas stream; and controlling a $H_2$ concentration in the exhaust gas stream for a period of time, wherein controlling the $H_2$ concentration comprises: introducing hydrogen gas ($H_2$) from a $H_2$ source into the exhaust gas stream upstream of the platinum-containing TWC catalyst article; and modulating the $H_2$ introduction, wherein modulating the $H_2$ introduction comprises obtaining a signal from a feedback sensor and/or a temperature sensor, the feedback sensor located upstream from the TWC catalyst article, and the temperature sensor located upstream from or inside the TWC catalyst article, both sensors in contact with the exhaust gas stream; and controlling a quantity of $H_2$ introduced using said signal.

In some embodiments, modulating the $H_2$ introduction comprises introducing $H_2$ into the exhaust gas stream when the signal from the temperature sensor corresponds to a temperature in the range from about 90° C. to about 190° C. In some embodiments, the period of time is up to about 200 seconds.

The present articles, systems and methods are suitable for treatment of exhaust gas streams from mobile emissions sources such as trucks and automobiles. The present articles, systems and methods are also suitable for treatment of exhaust streams from stationary sources such as power plants.

It will be readily apparent to one of ordinary skill in the relevant arts that suitable modifications and adaptations to the compositions, methods, and applications described herein can be made without departing from the scope of any embodiments or aspects thereof. The compositions and methods provided are exemplary and are not intended to limit the scope of the claimed embodiments. All of the various embodiments, aspects, and options disclosed herein can be combined in all variations. The scope of the compositions, formulations, methods, and processes described herein include all actual or potential combinations of embodiments, aspects, options, and examples herein. All patents and publications cited herein are incorporated by reference herein for the specific teachings thereof as noted, unless other specific statements of incorporation are specifically provided.

Although the present disclosure herein has been described with reference to particular embodiments, it is to be understood that these embodiments are merely illustrative of the principles and applications of the present disclosure. It will be apparent to those skilled in the art that various modifications and variations can be made to the method and apparatus of the present disclosure without departing from the spirit and scope of the disclosure. Thus, it is intended that the present disclosure include modifications and variations that are within the scope of the appended claims and their equivalents.

Reference throughout this specification to "one embodiment," "certain embodiments," "one or more embodiments" or "an embodiment" means that a particular feature, structure, material, or characteristic described in connection with the embodiment is included in at least one embodiment of the disclosure. Thus, the appearances of phrases such as "in one or more embodiments," "in certain embodiments," "in one embodiment" or "in an embodiment" in various places throughout this specification are not necessarily referring to the same embodiment of the disclosure. Furthermore, the particular features, structures, materials, or characteristics may be combined in any suitable manner in one or more embodiments. Any ranges cited herein are inclusive.

The present disclosure is now described with reference to the following examples. Before describing several exemplary embodiments of the disclosure, it is to be understood that the disclosure is not limited to the details of construction or process steps set forth in the following description. The present disclosure is capable of other embodiments and of being practiced or being carried out in various ways.

EXAMPLES

TWC Catalyst Article Preparation

Example 1: Pd in Bottom Coat; Conventional TWC (Reference)

A conventional two-layered, three-way catalyst (TWC) reference article was prepared, having a bottom coat comprising Pd and a top coat comprising Pd and Rh.

For the bottom coat, an impregnated support material was prepared by incipient wetness impregnation of a Pd nitrate solution onto 0.40 $g/in^3$ of high-surface area $\gamma$-alumina, resulting in a loading of 18.6 $g/ft^3$ of Pd. The resulting impregnated powder support material was calcined at 550° C., made into slurry, and milled to obtain a first slurry. A second slurry was prepared by adding Pd nitrate solution to a slurry comprising 0.80 $g/in^3$ of ceria-zirconia composite (45 weight % $CeO_2$), resulting in a loading of 43.4 $g/ft^3$ of Pd. The resulting impregnated powder was calcined at 550° C., made into slurry, and milled. A single aqueous washcoat was formed by combining the first slurry in water, along with acid, with the second slurry. Baria (0.15 $g/in^3$) and lanthana (0.05 $g/in^3$) promoters were also dispersed therein. Alumina binder was added to the washcoat slurry, which was then coated onto a monolith substrate at a loading of 1.46 $g/in^3$, the substrate dried in air, and calcined at 550° C. in air, to form the first (bottom) layer of the TWC article.

The second (top) layer coating was then prepared. Pd nitrate solution was incipient wetness impregnated onto 0.20 $g/in^3$ of high surface area lanthana-doped gamma-alumina, resulting in a Pd loading of 12.7 $g/ft^3$. The resulting impregnated powder support material was calcined at 550° C., made into slurry, and milled to obtain a first slurry. A second slurry was prepared by adding Pd nitrate solution to 0.40 $g/in^3$ of ceria-zirconia composite (29 weight % $CeO_2$), resulting in a loading of 12.7 $g/ft^3$ of Pd. The resulting impregnated powder support material was calcined at 550° C., made into a slurry, and milled. A third slurry was prepared by adding rhodium nitrate solution to 0.30 $g/in^3$ of high-surface area $\gamma$-alumina, resulting in a loading of 14.5 $g/ft^3$ Rh. The resulting impregnated powder support material was calcined at 550° C., made into slurry, and milled. The resulting slurry was combined with the first and second slurries. A lanthana (0.05 $g/in^3$) promoter was dispersed in the slurry, and alumina (0.02 $g/in^3$) and zirconia (0.05 $g/in^3$) binders were added to the slurry. The obtained slurry was then coated onto a monolithic substrate at a loading of 1.38 $g/in^3$, dried in air, and calcined at 550° C. in air. The total washcoat loading after calcination was 2.5 $g/in^3$.

Example 2: Pt and Pd in Bottom Coat, with Pd on OSC

A two-layered, platinum-containing three-way catalyst (TWC) article was prepared having a bottom coat comprising Pt and Pd and a top coat comprising Pd and Rh.

For the bottom coat, an impregnated support material was prepared by incipient wetness impregnation of a 50% Pd nitrate solution and 100% of Pt-MEA (monoethanolamine) solution onto 0.40 $g/in^3$ of high-surface area La-stabilized $\gamma$-alumina, resulting in a loading of 15.5 $g/ft^3$ of Pd and 30.9 $g/ft^3$ of Pt. A further impregnated support material was prepared by incipient wetness impregnation of 50% Pd nitrate solution onto 0.80 $g/in^3$ of ceria-zirconia composite (45 wt % $CeO_2$), resulting in a loading of 15.5 $g/ft^3$ of Pd. Both resulting impregnated powder support materials were calcined at 550° C., and mixed into a combined slurry. Baria (0.15 $g/in^3$) and lanthana (0.05 $g/in^3$) promoters were also dispersed therein. Alumina binder was added to the washcoat slurry, which was then coated onto a monolith substrate at a loading of 1.46 $g/in^3$, the substrate dried in air, and calcined at 550° C. in air, to form the first (bottom) layer of the platinum-containing TWC article.

The second (top) layer coating was then prepared. Pd nitrate solution was incipient wetness impregnated onto 0.20 $g/in^3$ of high surface area lanthana-doped $\gamma$-alumina and 0.40 $g/in^3$ of ceria-zirconia composite (30 wt % $CeO_2$), resulting in a Pd loading of 25.4 $g/in^3$. The resulting impregnated powder support material was calcined at 550° C., made into slurry, and milled to obtain a first slurry. A second slurry was prepared by adding Rh nitrate solution to 0.30 $g/in^3$ of lanthana-doped $\gamma$-alumina, resulting in a loading of 14.5 $g/ft^3$ of Rh. The resulting impregnated powder support material was calcined at 550° C., made into a slurry, and milled. The resulting slurry was combined with the first slurry. A lanthana (0.05 g/in$^3$) promoter was dispersed in the slurry, and alumina (0.02 g/in$^3$) and zirconia (0.05 g/in$^3$) binders were added to the slurry. The obtained slurry was then coated onto a monolithic substrate at a loading of 1.04 g/in$^3$, dried in air, and calcined at 550° C. in air. The total washcoat loading on the substrate after calcination was 2.5 g/in$^3$.

Example 3: Pt and Pd in Bottom Coat, with Pt and Pd on OSC

A two-layered, platinum-containing three-way catalyst (TWC) article was prepared having a bottom coat comprising Pt and Pd and a top coat comprising Pd and Rh.

For the bottom coat, an impregnated support material was prepared by incipient wetness impregnation of a 50% of Pd nitrate solution onto 0.40 g/in$^3$ of high-surface area La-stabilized γ-alumina, resulting in a loading of 15.5 g/ft$^3$ of Pd. A further impregnated support material was prepared by incipient wetness impregnation of another 50% of Pd nitrate solution and 100% of Pt-MEA (monoethanolamine) solution onto 0.80 g/in$^3$ of ceria-zirconia composite (45 wt % CeO$_2$), resulting in a loading of 15.5 g/ft$^3$ of Pd and 30.9 g/ft$^3$ Pt. Both the impregnated powder support materials were calcined at 550° C., and made into a combined slurry. Baria (0.15 g/in$^3$) and lanthana (0.05 g/in$^3$) promoters were also dispersed therein. Alumina binder was added to the washcoat slurry, which was then coated onto a monolith substrate at a loading of 1.46 g/in$^3$, the substrate dried in air, and calcined at 550° C. in air, to form the first (bottom) layer of the platinum-containing TWC article.

The second (top) layer coating was then prepared. A solution of Pd nitrate was incipient wetness impregnated onto 0.20 g/in$^3$ of high surface area lanthana-doped γ-alumina and 0.40 g/in$^3$ of ceria-zirconia composite (30 wt % Ce (2), resulting in a Pd loading of 25.4 g/in$^3$. The resulting impregnated powder support material was calcined at 550° C., made into a slurry, and milled to obtain a first slurry. A second slurry was prepared by adding Rh nitrate solution to 0.30 g/in$^3$ of lanthana-doped γ-alumina, resulting in a loading of 14.5 g/ft$^3$ of Rh. The resulting impregnated powder support material was calcined at 550° C., made into a slurry, and milled. The resulting second slurry was combined with the first slurry. A lanthana (0.05 g/in$^3$) promoter was dispersed in the slurry, and alumina (0.02 g/in$^3$) and zirconia (0.05 g/in$^3$) binders were added to the slurry. The obtained slurry was then coated onto a monolithic substrate at a loading of 1.04 g/in$^3$, dried in air, and calcined at 550° C. in air. The total washcoat loading on the substrate after calcination was 2.5 g/in$^3$.

Example 4. Aging

The prepared catalyst articles of Example 1-3 were aged using either of two protocols (mild and severe). Core samples (1" diameter by 3" length) were removed from the articles of Examples 1-3. For mild aging, the article was hydrothermally aged in a tube furnace at 950° C. for 12 hours in 10% H$_2$O/air. For severe aging, the article was aged at 995° C. (pulse flame reactor) for 40 hours under the ZDAKW (Zyklus des Abgaszentrums deutscher Automobilhersteller zur Katalysatorweiterentwicklung; Cycle of the Exhaust Center of German Automobile Manufacturers for Further Catalyst Development) protocol.

Example 5: Laboratory Reactor Simulations

The catalyst articles of Examples 1-3, aged according to Example 4, were evaluated under EPA Federal Test Procedure (FTP-72) conditions on a laboratory reactor (Gasoline Vehicle Simulator, GVS), measuring the hydrocarbon (HC), carbon monoxide (CO), and nitrogen oxides (NO$_x$) emissions. The FTP-72 driving cycle comprises three phases: cold start, normal driving, and hot restart, and simulates actual real-world driving conditions for various makes, models, and model years of vehicles.

The laboratory reactor allowed evaluation of the impact of hydrogen injection on catalytic article performance under simulated, controlled exhaust conditions (temperature of the exhaust, air-to-fuel ratio, concentration of exhaust gas components, etc.) as would be experienced by an actual catalytic article inside the exhaust system of a vehicle. The laboratory reactor was also configured to simulate other driving cycle conditions (WLTC, etc.), as well as to run steady-state tests common in real-life field conditions (light-off, oxygen storage capacity tests, etc.). The laboratory reactor contained a UEGO sensor arrangement upstream of the catalytic article, and was configured to inject hydrogen gas into a simulated exhaust stream to vary the CO to H$_2$ ratio. The hydrogen source used for introduction of hydrogen was a compressed hydrogen cylinder.

In a first experiment, conversion performance of Example 1 (Reference) and Examples 2 and 3 with respect to carbon monoxide (CO) oxidation, hydrocarbon (HC) oxidation, and nitrogen oxide (NO$_x$) reduction was evaluated for the mild and severe aged samples under the FTP-72 driving cycle simulating the behaviour of the Model Year 2016 Ford Edge vehicle.

Figure 13:
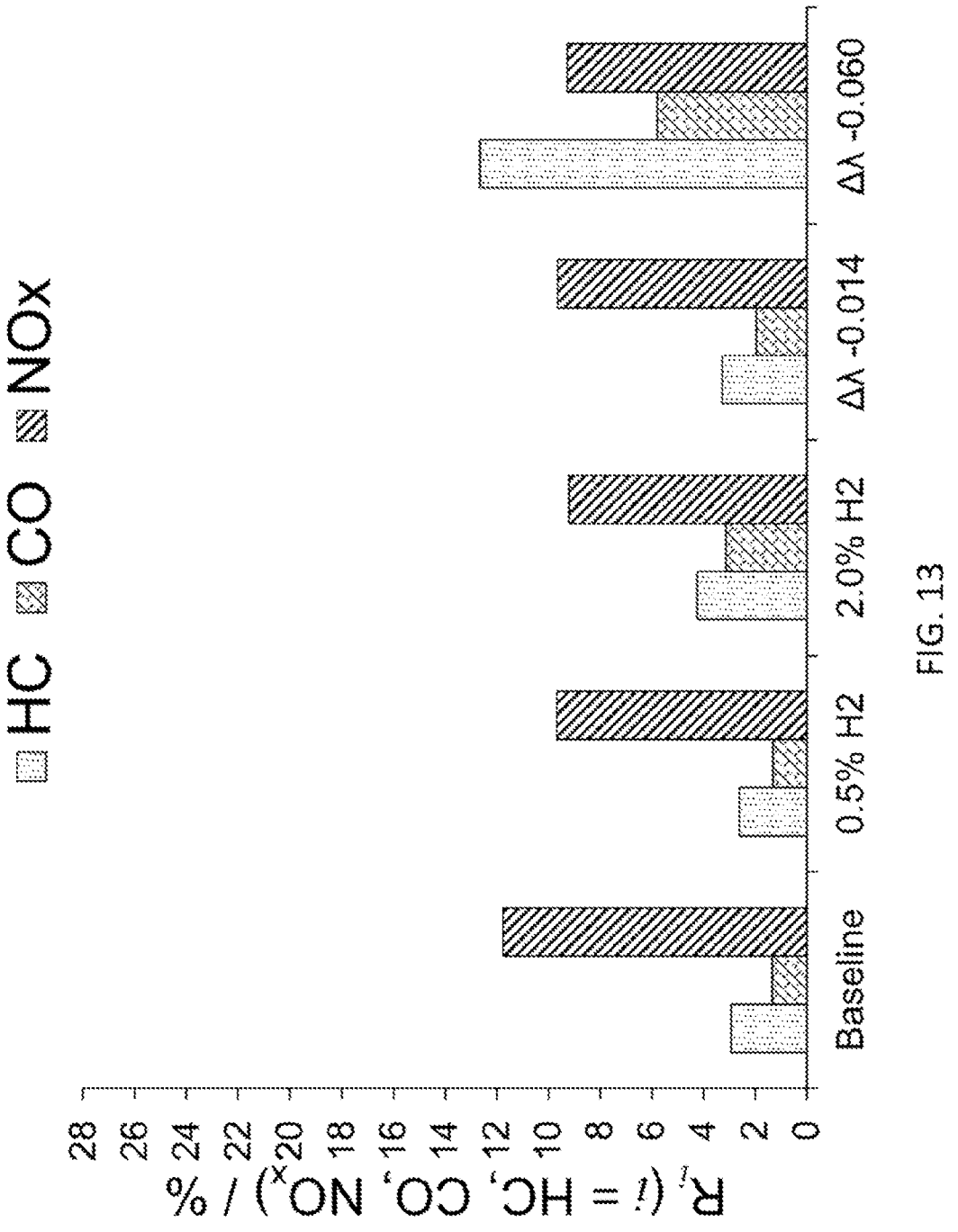
FIG. 13 is a bar graph illustrating the catalytic performance toward NO reduction and CO and HC oxidation after mild aging for a platinum-containing TWC catalyst embodiment of the disclosure, with and without introduction of $H_2$.
Figure 14:
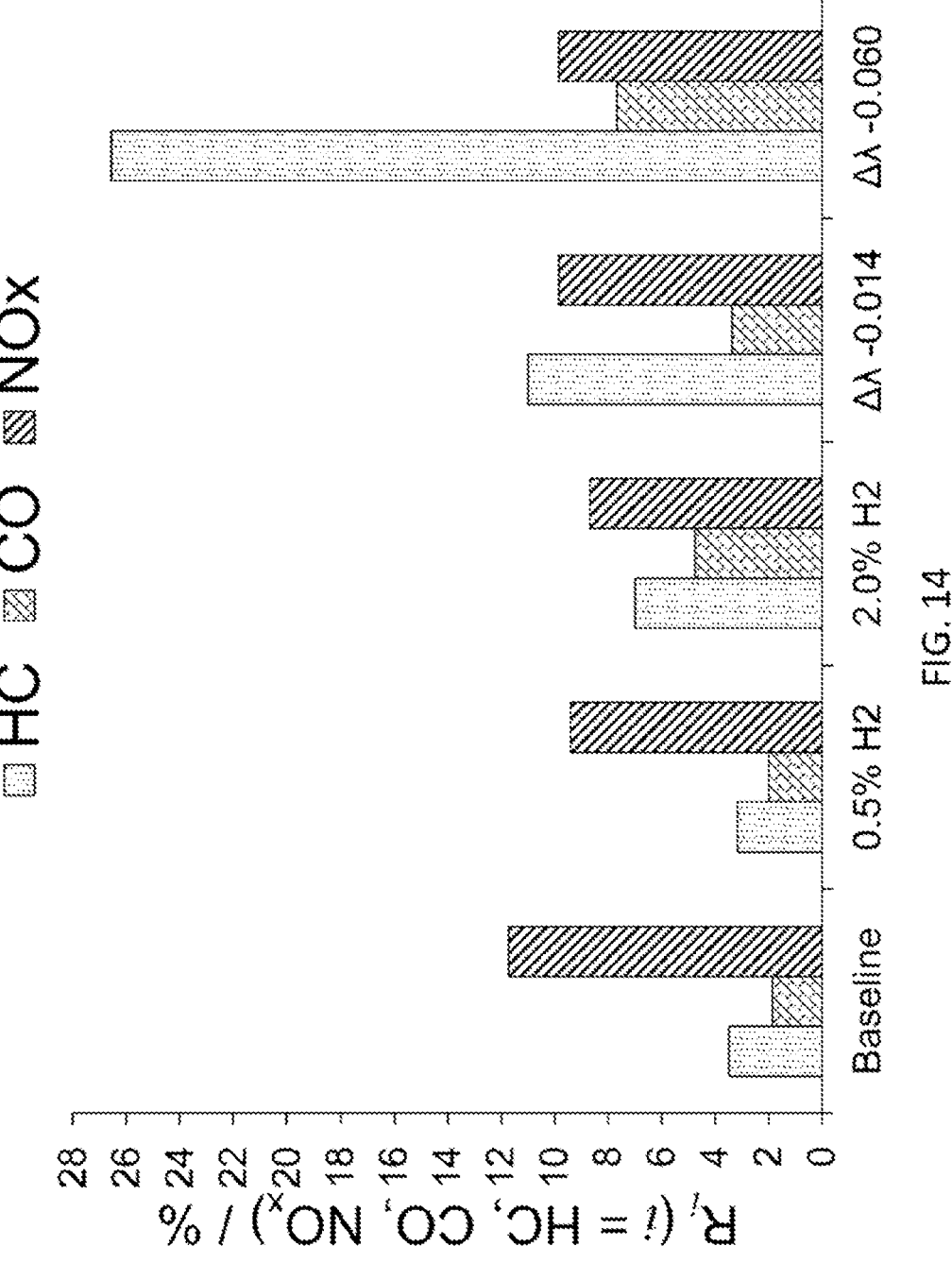
FIG. 14 is a bar graph illustrating the catalytic performance toward CO and HC oxidation and NO reduction after severe aging for a platinum-containing TWC catalyst embodiment of the disclosure, with and without introduction of $H_2$.

The data provided in FIGS. 9 through 14 feature the HC, CO, and NO$_x$ cumulative emissions (expressed as residual percentage, with lower value indicating better catalyst performance) measured for an FTP-72 driving cycle for the catalysts of Example 1 (FIGS. 9 and 10; after mild and severe aging, respectively), Example 2 (FIGS. 11 and 12; after mild and severe aging, respectively), and Example 3 (FIGS. 13 and 14; after mild and severe aging, respectively).

The baseline emissions were compared with either H$_2$ injection in the amount of 0.5 vol. % or 2.0 vol. %, or equivalent an Δλ of −0.014 or −0.060, applied during the first 200 s. All the other parameters of the test were kept constant.

Figure 9:
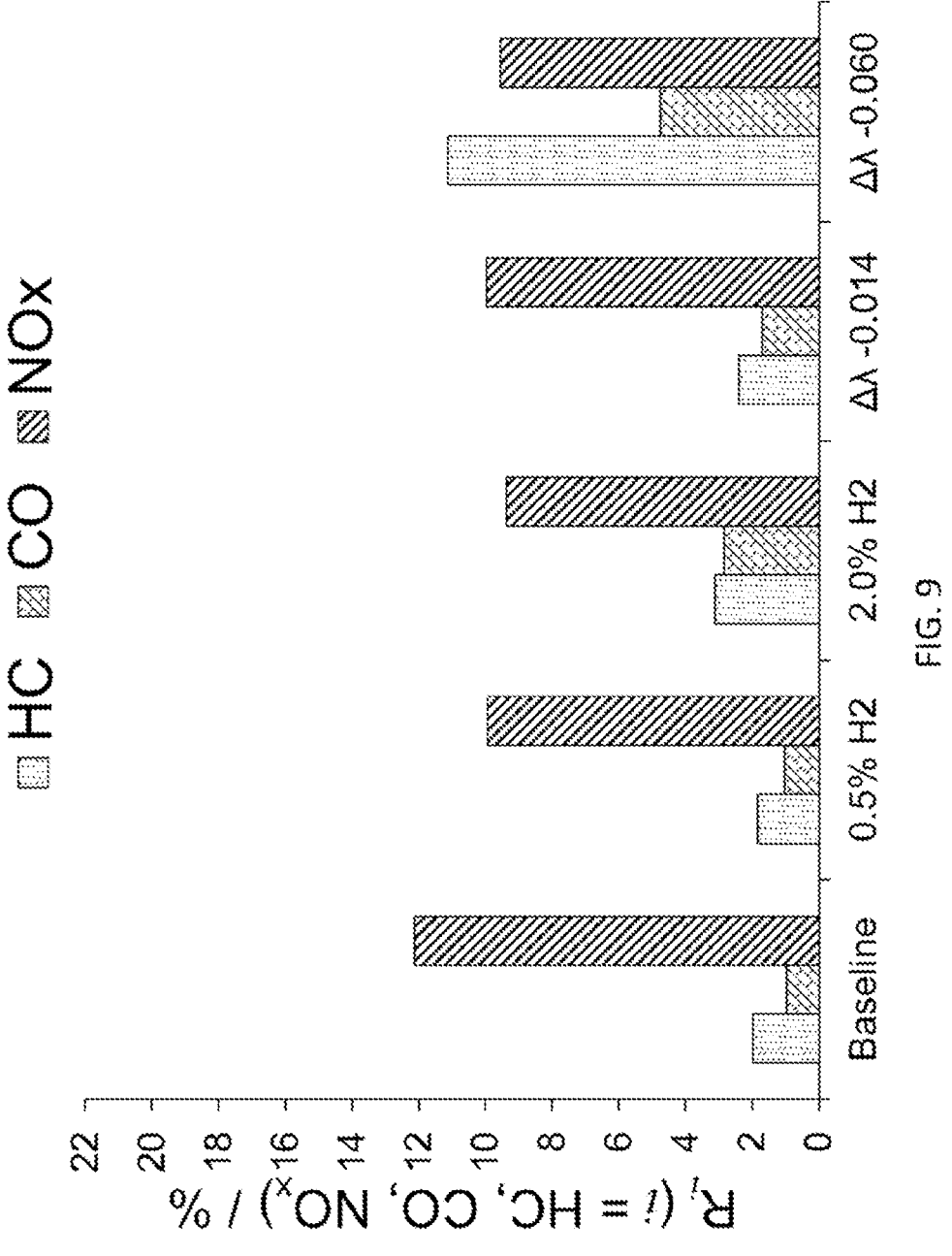
FIG. 9 is a bar graph illustrating the catalytic performance toward CO and HC oxidation and NO reduction after mild aging for a platinum-containing three-way conversion (TWC) catalyst embodiment of the disclosure with and without introduction of hydrogen ($H_2$)
Figure 10:
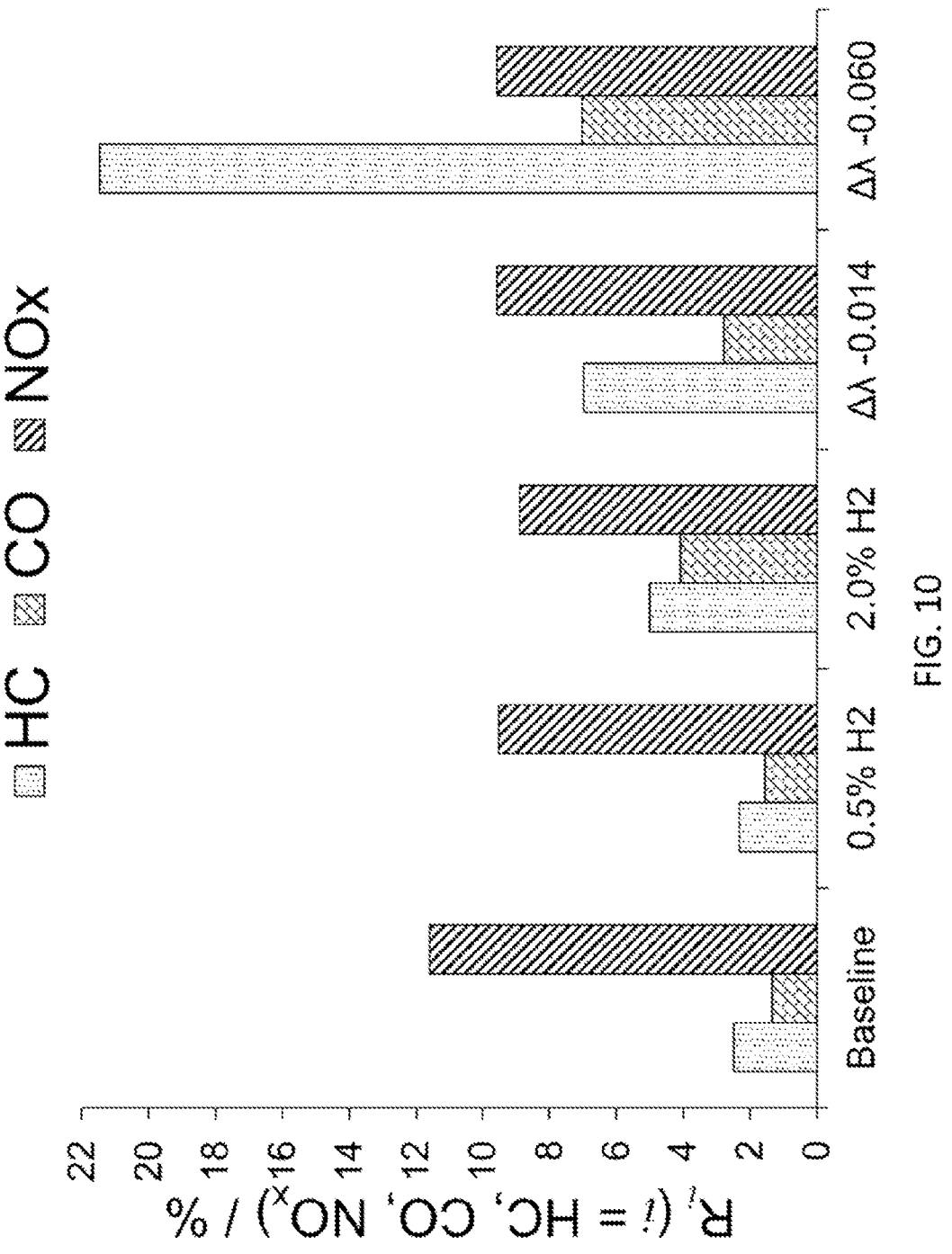
FIG. 10 is a bar graph illustrating the catalytic performance toward CO and HC oxidation and NO reduction after severe aging for a platinum-containing TWC catalyst embodiment of the disclosure, with and without introduction of $H_2$.
Figure 11:
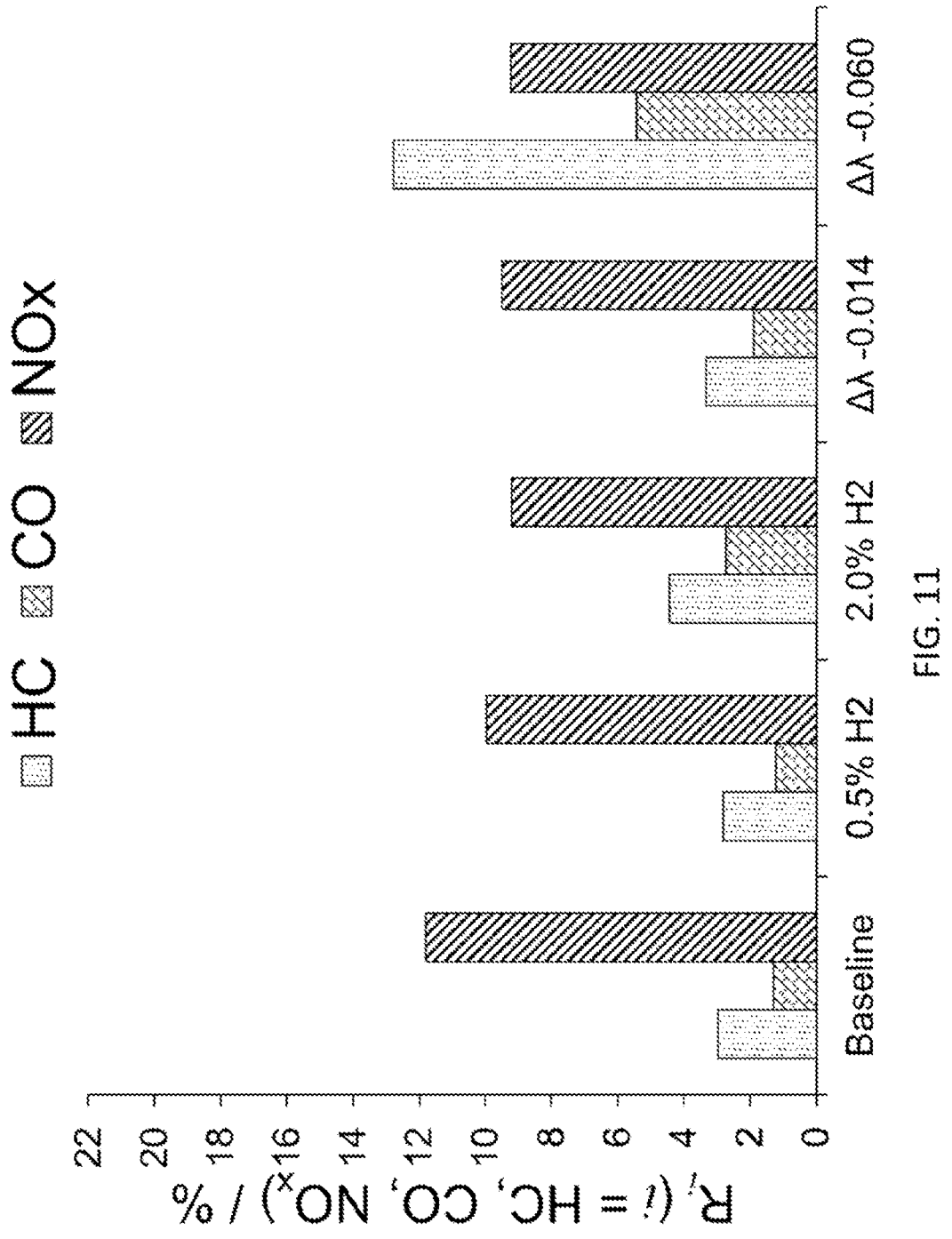
FIG. 11 is a bar graph illustrating the catalytic performance toward CO and HC oxidation and NO reduction after mild aging for a platinum-containing TWC catalyst embodiment of the disclosure, with and without introduction of $H_2$.
Figure 12:
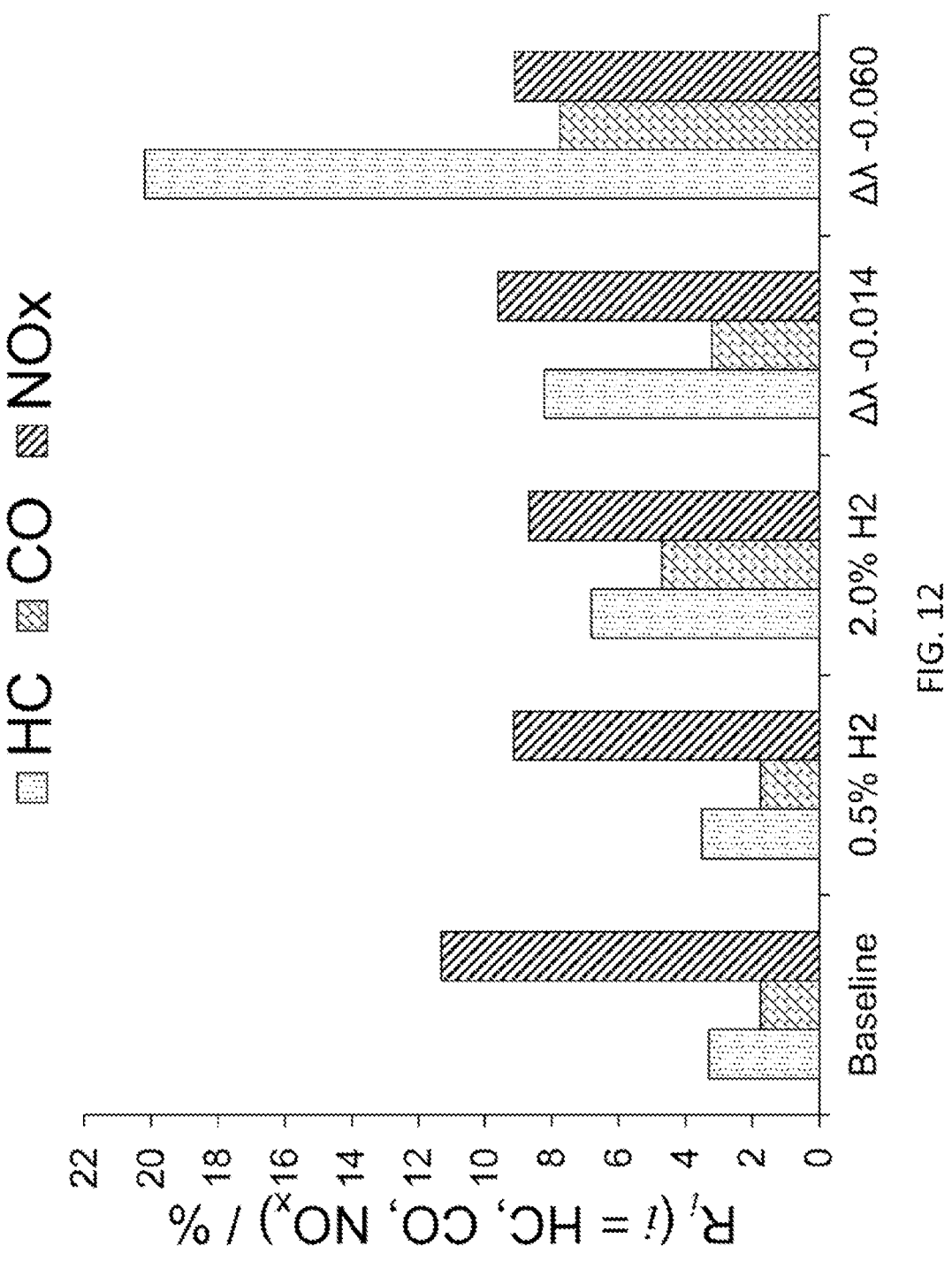
FIG. 12 is a bar graph illustrating the catalytic performance toward CO and HC oxidation and NO reduction after severe aging for a platinum-containing TWC catalyst embodiment of the disclosure, with and without introduction of $H_2$.

With reference to FIG. 9, data for catalyst Example 1 after mild aging demonstrated that the application of 0.5 vol. % H$_2$ improved NO$_x$ conversion relative to baseline emission. The introduction of 2.0 vol. % H$_2$ further benefitted catalyst activity in NO$_x$ conversion, but exhibited some degree of negative impact on the conversion of HC and CO. In comparison, applying a rich λ-bias of 0.986, i.e., air/fuel ratio decreased below stoichiometric by Δλ−0.014, although benefiting NO$_x$ conversion similar to introduction of 0.5 vol. % H$_2$, had a negative impact on HC and CO conversion. Similarly, applying a Δ-bias of Δλ−0.060 improved NO$_x$ conversion comparable to that observed with introduction of 2.0 vol. % H$_2$, but the former treatment had a pronounced negative effect on catalyst activity towards HC and CO conversion. For each experiment, introduction of H$_2$ into the exhaust stream provided an improvement of NO$_x$ activity with little to no penalty in HC and CO conversion, in contrast to applying a λ-bias (FIGS. 10-14).

Example 6. Steady State Light Off

Steady state light off Tso values (Tso is the temperature at which a 50% conversion is achieved) for HC, NO, and CO were determined for catalysts of Examples 1-3 under lean (λ=1.060) and rich (λ=0.960) conditions. This experimental models typical conditions experienced by a catalyst article during operation in a gasoline vehicle exhaust system. For each condition, injection of $H_2$ (0.5 vol. %) was compared with baseline (no injection of $H_2$). All other parameters of the tests were identical.

Figure 15:
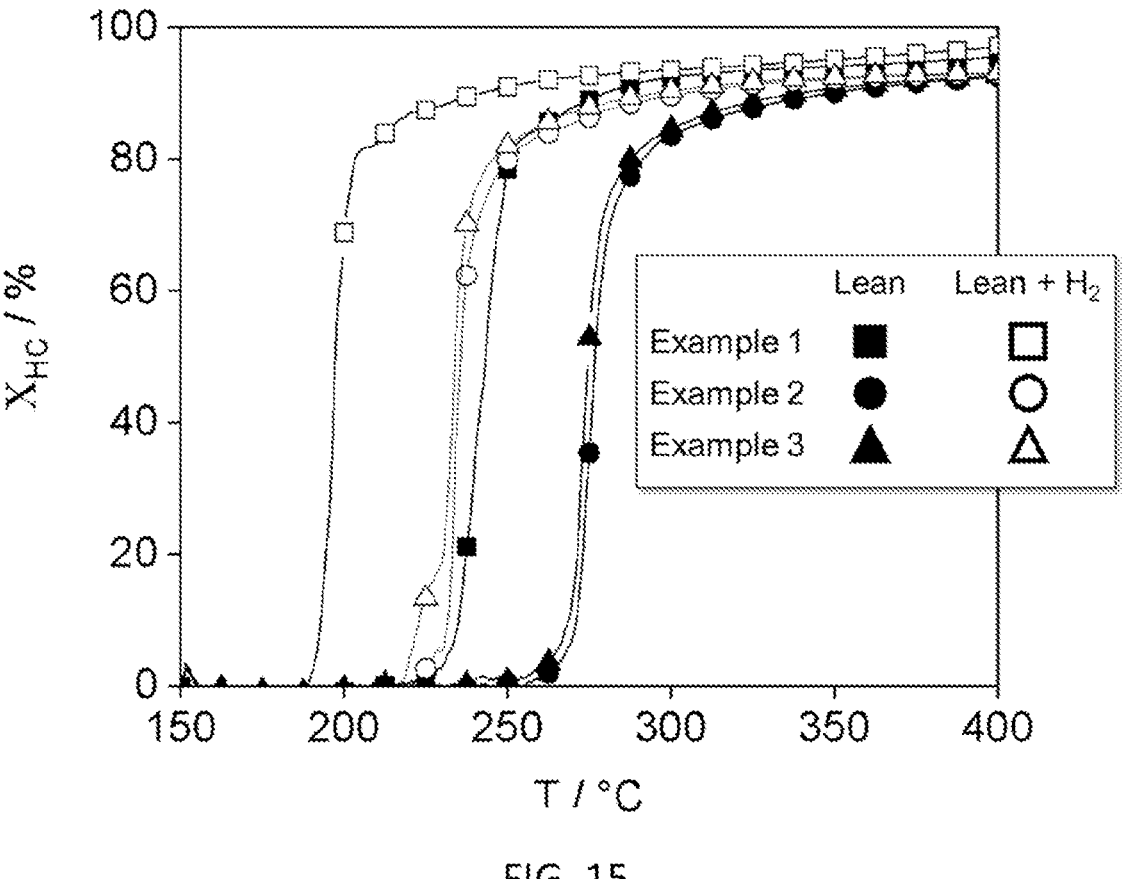
FIG. 15 is a line graph illustrating the downward temperature shift of HC light-off for conventional and Pt-containing TWC severely aged catalyst embodiments of the disclosure with introduction of 0.5% $H_2$ under lean light-off conditions ($\lambda$=1.060)
Figure 16:
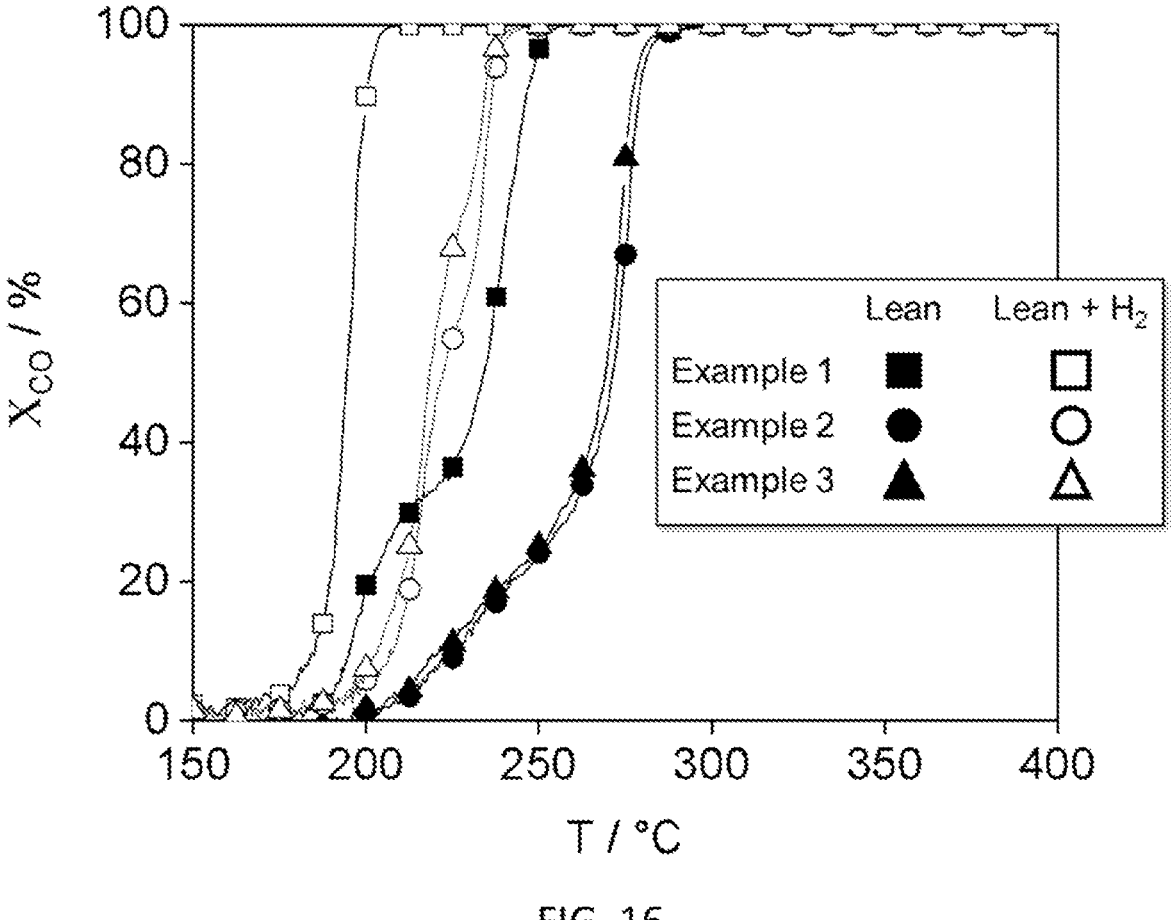
FIG. 16 is a line graph illustrating the downward temperature shift for CO light-off for conventional and Pt-containing TWC severely aged catalyst embodiments of the disclosure with introduction of 0.5% $H_2$ under lean light-off conditions ($\lambda$=1.060)
Figure 17:
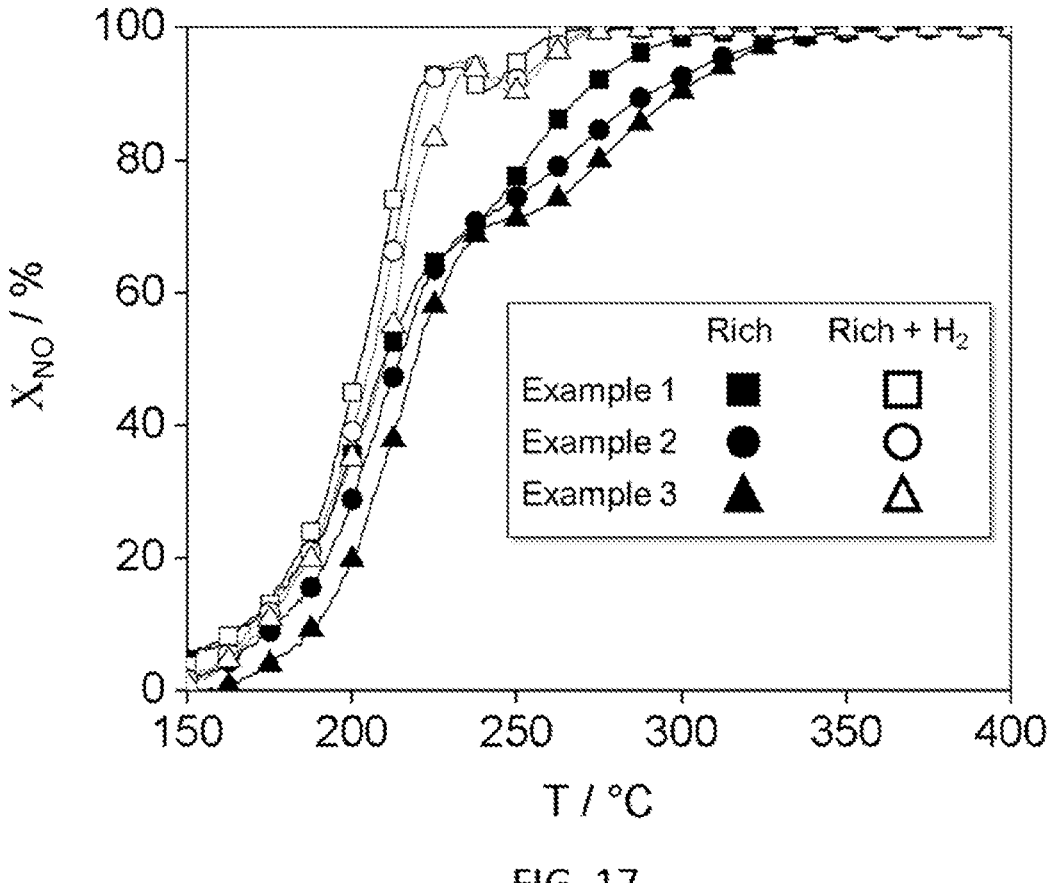
FIG. 17 is a line graph illustrating the downward temperature shift of NO light-off for conventional and Pt-containing TWC severely aged catalyst embodiments of the disclosure with introduction of 0.5% $H_2$ under rich light-off conditions ($\lambda$=0.960).

Representative results are provided in FIGS. 15 through 17, which demonstrated that introduction of $H_2$ in all cases provided a shift in the light-off curve towards lower temperature, indicating improved activity of the catalyst systems. The full data set with corresponding Tso values is provided in Tables 1 through 3, which demonstrated that introduction of 0.5 vol. % $H_2$ improved catalytic activity of the catalyst article under these conditions (significantly lowered HC, CO, and $NO_x$ $T_{50}$).

TABLE 1

$T_{50}$ for HC/$NO_x$/CO for catalyst article of Example 1.

| Aging Protocol | Condition | $T_{50}$ Total HC (° C.) | $T_{50}$ $NO_x$ (° C.) | $T_{50}$ CO (° C.) |
|---|---|---|---|---|
| mild | lean | 220.5 | — | 207.8 |
| mild | lean + $H_2$ | 182.5 | — | 177.0 |
| mild | rich | — | 188.8 | 207.3 |
| mild | rich + $H_2$ | — | 182.5 | 194.8 |
| severe | lean | 242.5 | — | 233.5 |
| severe | lean + $H_2$ | 197.0 | — | 194.5 |
| severe | rich | — | 210.3 | 261.5 |
| severe | rich + $H_2$ | — | 202.8 | 218.3 |

TABLE 2

$T_{50}$ for HC/$NO_x$/CO for catalyst article of Example 2.

| Aging Protocol | Condition | $T_{50}$ Total HC (° C.) | $T_{50}$ $NO_x$ (° C.) | $T_{50}$ CO (° C.) |
|---|---|---|---|---|
| mild | lean | 239.0 | — | 231.3 |
| mild | lean + $H_2$ | 217.0 | — | 213.3 |
| mild | rich | — | 191.0 | 200.8 |
| mild | rich + $H_2$ | — | 189.5 | 196.3 |
| severe | lean | 276.0 | — | 271.0 |
| severe | lean + $H_2$ | 234.8 | — | 222.3 |
| severe | rich | — | 214.5 | 266.0 |
| severe | rich + $H_2$ | — | 205.8 | 223.5 |

TABLE 3

$T_{50}$ for HC/$NO_x$/CO for catalyst article of Example 3.

| Aging Protocol | Condition | $T_{50}$ Total HC (° C.) | $T_{50}$ $NO_x$ (° C.) | $T_{50}$ CO (° C.) |
|---|---|---|---|---|
| mild | lean | 232.8 | — | 228.8 |
| mild | lean + $H_2$ | 215.5 | — | 211.3 |
| mild | rich | — | 191.5 | 208.5 |
| mild | rich + $H_2$ | — | 189.0 | 196.8 |
| severe | lean | 274.3 | — | 268.5 |
| severe | lean + $H_2$ | 233.5 | — | 218.5 |
| severe | rich | — | 219.3 | 269.0 |
| severe | rich + $H_2$ | — | 210.3 | 229.0 |

The disclosure is now described with reference to the following embodiments and it is to be understood that the disclosure is not limited to these embodiments and is capable of other embodiments and of being practiced or being carried out in various ways.

1. A platinum-containing three-way conversion (TWC) catalyst article effective to oxidize carbon monoxide and hydrocarbons and reduce nitrogen oxides in an exhaust gas stream from a gasoline engine, the TWC platinum-containing catalyst article comprising a substrate, a first catalyst composition disposed on at least a portion of the substrate, and a second catalyst composition disposed on at least a portion of the substrate, wherein the second catalyst composition comprises:

a first palladium component, wherein at least a portion of the first palladium component is impregnated on a first refractory metal oxide support, and at least another portion of the first palladium component is impregnated on a first oxygen storage component; and a rhodium component impregnated on a second refractory metal oxide support; and wherein the first catalyst composition comprises:

a second palladium component, wherein at least a portion of the second palladium component is impregnated on a third refractory metal oxide support, and at least another portion of the second palladium component is impregnated on a second oxygen storage component; and a platinum component, wherein the platinum component is impregnated on the third refractory metal oxide support, or wherein the platinum component is impregnated on the second oxygen storage component.

2. The platinum-containing TWC catalytic article of embodiment 1, wherein the first refractory metal oxide support comprises alumina, zirconia, titania, ceria, or a combination thereof, and wherein the first refractory metal oxide support is optionally doped with a rare earth metal oxide.

3. The platinum-containing TWC catalytic article of embodiment 2, wherein the rare earth metal oxide is lanthanum oxide, praseodymium oxide, yttrium oxide, neodymium oxide, or any combination thereof.

4 The platinum-containing TWC catalytic article of embodiment 2, wherein the first refractory metal oxide support is lanthana-alumina, ceria-alumina, zirconia-alumina, ceria-zirconia-alumina, lanthana-zirconia-alumina, or lanthana-neodymia alumina.

5. The platinum-containing TWC catalytic article of embodiment 2, wherein the first refractory metal oxide support is lanthana-alumina.

6. The platinum-containing TWC catalytic article of embodiment 1, wherein the first oxygen storage component comprises ceria, zirconia, alumina, silica, titania, lanthana, baria, praseodymia, yttria, samaria, gadolinia, or a combination thereof.

7. The platinum-containing TWC catalytic article of embodiment 1, wherein the first oxygen storage component comprises ceria.

8. The platinum-containing TWC catalytic article of embodiment 1, wherein the first oxygen storage component is a ceria-zirconia composite comprising zirconia in an amount from about 5 wt % to about 20 wt %, based on the total weight of the ceria-zirconia composite.

9. The platinum-containing TWC catalytic article of embodiment 1, wherein the rhodium component is present in an amount from about 0.05 wt % to about 5 wt %, based on the total weight of the second layer.

10. The platinum-containing TWC catalytic article of embodiment 1, wherein the second refractory metal oxide support comprises alumina, zirconia, titania, ceria, or a combination thereof, and wherein the second refractory metal oxide support is optionally doped with a rare earth metal oxide.

11. The platinum-containing TWC catalytic article of embodiment 1, wherein the second refractory metal oxide support is lanthana-alumina, ceria-alumina, zirconia-alumina, ceria-zirconia-alumina, lanthana-zirconia-alumina, or lanthana-neodymia alumina.

12. The platinum-containing TWC catalytic article of embodiment 1, wherein the third refractory metal oxide support comprises alumina, zirconia, titania, ceria, or combinations thereof, and wherein the third refractory metal oxide support is optionally doped with a rare earth metal oxide.

13. The platinum-containing TWC catalytic article of embodiment 12, wherein the third refractory metal oxide support is lanthana-alumina, ceria-alumina, zirconia-alumina, ceria-zirconia-alumina, lanthana-zirconia-alumina, or lanthana-neodymia alumina.

14. The platinum-containing TWC catalytic article of embodiment 1, wherein the second oxygen storage component comprises ceria, zirconia, alumina, silica, titania, lanthana, baria, praseodymia, yttria, samaria, gadolinia, or a combination thereof.

15. The platinum-containing TWC catalytic article of embodiment 1, wherein the second oxygen storage component comprises ceria.

16. The platinum-containing TWC catalytic article of embodiment 15, wherein the second oxygen storage component further comprises one or more of zirconia, lanthana, baria, praseodymia, yttria, samaria, gadolinia, or a combination thereof.

17. The platinum-containing TWC catalytic article of embodiment 1, wherein the oxygen storage component is a ceria-zirconia composite comprising zirconia in an amount from about 5 wt % to about 20 wt %, based on the total weight of the ceria-zirconia composite.

18. The platinum-containing TWC catalytic article of embodiment 1, wherein the first catalyst composition further comprises a rare earth metal oxide, an alkaline earth metal component, or both.

19. The platinum-containing TWC catalytic article of embodiment 18, wherein the rare earth metal oxide is lanthanum oxide, praseodymium oxide, yttrium oxide, neodymium oxide, or any combination thereof.

20. The platinum-containing TWC catalytic article of embodiment 18, wherein the alkaline earth metal component is present in an amount from about 1 wt % to about 40 wt %, based on the total weight of the first layer.

21. The platinum-containing TWC catalytic article of embodiment 20, wherein the alkaline earth metal component comprises calcium, magnesium, strontium, barium, or a combination thereof.

22. The platinum-containing TWC catalytic article of embodiment 21, wherein the alkaline earth metal component is barium sulfate.

23. The platinum-containing TWC catalytic article of embodiment 1, wherein the platinum component is impregnated on the third refractory metal oxide support.

24. The platinum-containing TWC catalytic article of embodiment 1, wherein the platinum component is impregnated on the second oxygen storage component.

25. The platinum-containing TWC catalytic article of embodiment 1, wherein the second catalyst composition comprises:
lanthana-doped alumina impregnated with a portion of the first palladium component;

ceria-zirconia impregnated with a portion of the first palladium component;
alumina impregnated with the rhodium component; and
lanthanum oxide.

26. The platinum-containing TWC catalytic article of embodiment 1, wherein the first catalyst composition comprises:
alumina impregnated with the platinum component and a portion of the second palladium component;
ceria-zirconia impregnated with a portion of the second palladium component;
lanthanum oxide; and
barium sulfate.

27. The platinum-containing TWC catalytic article of embodiment 1, wherein the first catalyst composition comprises:
alumina impregnated with a portion of the second palladium component;
ceria-zirconia impregnated with platinum and a portion of the second palladium component;
lanthanum oxide; and
barium sulfate.

28. The platinum-containing TWC catalytic article of embodiment 1, wherein the substrate is a metal or ceramic monolithic honeycomb substrate.

29. The platinum-containing TWC catalytic article of embodiment 28, wherein the metal or ceramic monolithic honeycomb substrate is a wall-flow filter substrate or a flow through substrate.

30. The platinum-containing TWC catalytic article of embodiment 1, wherein the first catalyst composition is disposed on the substrate as a first catalyst layer, and the second catalyst composition is disposed on the first catalyst layer.

31. A system for treating an exhaust gas stream from a gasoline engine, the exhaust gas stream comprising carbon monoxide (CO), the system comprising:
the platinum-containing three-way conversion (TWC) catalyst article of any one of embodiment 1 to 30, located downstream of and in fluid communication with the gasoline engine;
a source of hydrogen gas ($H_2$);
a feedback sensor located upstream from the platinum-containing TWC catalyst article and in contact with the exhaust gas stream; and
a control unit in communication with the feedback sensor;
wherein the system is configured to introduce $H_2$ from the $H_2$ source into the exhaust gas stream upstream of the platinum-containing TWC catalyst article during a cold-start period, and wherein the feedback sensor is configured to provide $H_2$ in the exhaust gas stream by modulating the $H_2$ introduction.

32. The system of embodiment 31, wherein the feedback sensors comprise a wide-band oxygen sensor (UEGO) and a temperature sensor.

33. The system of embodiment 31, wherein the source of $H_2$ is an on-board compressed hydrogen vessel.

34. The system of embodiment 31, wherein the source of $H_2$ is an on-board hydrogen generator.

35. The system of embodiment 34, wherein the on-board hydrogen generator comprises an alcohol reformer, an ammonia decomposition apparatus, an electrolysis apparatus, a fuel reformer, an exhaust gas reformer, or a combination thereof.

36. The system of embodiment 34, wherein the on-board hydrogen generator is an exhaust gas reformer comprising a catalytic reforming article located upstream from the catalytic article and in fluid communication with the exhaust gas stream.

37. The system of embodiment 34, wherein the on-board hydrogen generator comprises at least one $H_2$ generating component comprising a dopant comprising nanoparticles of aluminum, nanoparticles of aluminum/nickel, nanoparticles of aluminum/silica, nanoparticles of aluminum/cobalt, nanoparticles of aluminum/magnesium, nanoparticles of alumina, nanoparticles of magnesium, nanoparticles of magnesium/nickel, nanoparticles of zinc, sodium borohydride, or a combination thereof, and wherein the at least one $H_2$ generating component added to a gasoline fuel prior to combustion of said fuel in the gasoline engine.

38. The system of embodiment 31, further comprising a $H_2$ injection article upstream from the TWC catalyst article, upstream from the feedback sensor, in fluid communication with the exhaust gas stream and with the $H_2$ source, and in communication with the control unit; the $H_2$ injection article configured to introduce $H_2$ from the $H_2$ source into the exhaust gas stream upstream of the catalyst article.

39. The system of embodiment 31, configured to introduce $H_2$ into the exhaust gas stream when the exhaust gas stream temperature upstream of or within the TWC catalytic article is in a range from about 90° C. to about 190° C.

40. The system of embodiment 31, wherein, when a temperature of the exhaust gas stream upstream of or within the TWC catalytic article is in a range from about 90° C. to about 550° C., the exhaust gas stream contains no greater than about 20 vol % of $H_2$.

41. The system of embodiment 31, wherein the exhaust gas stream contains no greater than about 2 vol. % of $H_2$, or no greater than about 0.5 vol. % of $H_2$.

42. The system of embodiment 31, configured to introduce $H_2$ into the exhaust gas stream to provide a given $\Delta\lambda$ value no more negative than about −0.345 for a period of time, wherein:

$$\Delta\lambda = \bar{\lambda} - \lambda°;$$

$\lambda°$ is a pre-defined value; and
$\bar{\lambda}$ is a running average air-to-fuel ratio of the exhaust gas stream, calculated for a length of time according to the formula:

$$\bar{\lambda} = \frac{\sum_{i=1}^{N} \lambda_i}{N};$$

wherein (N) is the number of points comprised in this length of time, and $\lambda_i$ is the air-to-fuel ratio at each point.

43. The system of embodiment 42, wherein $\Delta\lambda$ is about −0.060, or about −0.014.

44. A method of treating an exhaust gas stream from a gasoline engine, the method comprising:
   contacting the exhaust gas stream with the platinum-containing TWC catalyst article of any one of embodiments 1-30, located downstream of the gasoline engine and in fluid communication with the exhaust gas stream;
   introducing hydrogen gas ($H_2$) from a $H_2$ source into the exhaust gas stream upstream of the TWC catalyst article; and controlling a concentration by volume of $H_2$ in the exhaust gas stream upstream from the TWC catalyst article, wherein controlling the concentration by volume of $H_2$ comprises modulating the $H_2$ introduction.

45. The method of embodiment 44, wherein controlling comprises introducing $H_2$ into the exhaust gas stream when a temperature of the exhaust gas stream upstream from or inside the TWC catalyst article is in a range from about 90° C. to about 550° C., or is in a range from about 90° C. to about 190° C.

46. The method of embodiment 44, wherein the $H_2$ is introduced for about 200 seconds.

47. The method of embodiment 44, wherein modulating the $H_2$ introduction comprises:
   obtaining a signal from a feedback sensor and/or a temperature sensor, the feedback sensor located upstream from the TWC catalyst article, and the temperature sensor located upstream from or inside the TWC catalyst article, both sensors in contact with the exhaust gas stream; and
   controlling a quantity of $H_2$ introduced using said signal.

48. The method of embodiment 47, wherein the exhaust gas stream contains no greater than about 20 vol. % of $H_2$, no greater than about 2 vol. % of $H_2$, or no greater than about 0.5 vol. % of $H_2$.

49. The method of embodiment 47, comprising:
   introducing $H_2$ into the exhaust gas stream; and
   providing a $\Delta\lambda$ value no more negative than about −0.345 for a period of time, wherein:

$$\Delta\lambda = \bar{\lambda} - \lambda°;$$

$\lambda°$ is a pre-defined value; and
$\bar{\lambda}$ is a running average air-to-fuel ratio of the exhaust gas stream, calculated for a length of time according to the formula:

$$\bar{\lambda} = \frac{\sum_{i=1}^{N} \lambda_i}{N};$$

wherein (N) is the number of points comprised in this length of time, and $\lambda_i$ is the air-to-fuel ratio at each point.

50. The method of embodiment 49, wherein $\Delta\lambda$ is about −0.060, or about −0.014.

51. The method of embodiment 49, wherein introducing $H_2$ further comprises generating $H_2$ during the combustion of gasoline in the gasoline engine, wherein generating $H_2$ comprises adding at least one $H_2$ generating component to the gasoline prior to combustion.

52. The method of embodiment 51, wherein the at least one $H_2$ generating component comprises a dopant comprising nanoparticles of aluminum, nanoparticles of aluminum/nickel, nanoparticles of aluminum/silica, nanoparticles of aluminum/cobalt, nanoparticles of aluminum/magnesium, nanoparticles of alumina, nanoparticles of magnesium, nanoparticles of magnesium/nickel, nanoparticles of zinc, sodium borohydride, or a combination thereof.

53. The method of embodiment 52, further comprising a vehicle comprising the gasoline engine and the TWC article.

54. The method of embodiment 53, wherein the at least one $H_2$ generating component is added to the gasoline on board the vehicle, or is added to the gasoline externally to the vehicle.

55. The method of embodiment 44, wherein introducing $H_2$ further comprises generating $H_2$, wherein generating $H_2$ comprises contacting the exhaust gas stream with an exhaust gas reforming catalyst.

56. A method for reducing a level of one or more of hydrocarbons, carbon monoxide, nitrogen oxide, and particulate matter in a gaseous exhaust stream from a gasoline engine, the method comprising contacting the gaseous exhaust stream with the exhaust gas treatment system of any one of embodiment 31 to 43.

57. A method of enhancing the cold-start catalytic performance of a platinum-containing TWC catalyst article, wherein the platinum-containing TWC catalyst article comprises a substrate, a first catalyst layer disposed on the substrate, and a second catalyst layer disposed on the first layer, wherein the second catalyst layer comprises a second catalyst composition comprising:

a first palladium component, wherein at least a portion of the first palladium component is impregnated on a first refractory metal oxide support, and at least another portion of the first palladium component is impregnated on a first oxygen storage component; and a rhodium component impregnated on a second refractory metal oxide support; and wherein the first catalyst layer comprises a first catalyst composition comprising:

a second palladium component, wherein at least a portion of the second palladium component is impregnated on a third refractory metal oxide support, and at least another portion of the second palladium component is impregnated on a second oxygen storage component; and a platinum component, wherein the platinum component is impregnated on the third refractory metal oxide support, or wherein the platinum component is impregnated on the second oxygen storage component;

the method comprising:

contacting the exhaust gas stream with the platinum-containing TWC catalyst article, located downstream of a gasoline engine and in fluid communication with an exhaust gas stream;

controlling a concentration by volume of $H_2$ in the exhaust gas stream for a period of time, wherein controlling the concentration by volume of $H_2$ comprises introducing hydrogen gas ($H_2$) from a $H_2$ source into the exhaust gas stream upstream of the TWC catalyst article; and modulating the $H_2$ introduction using a signal from a feed-back sensor.

58. The method of embodiment 57, wherein modulating comprises introducing Hz into the exhaust gas stream when the signal from the temperature sensor corresponds to a temperature in the range from about 90° C. to about 190° C.

59. The method of embodiment 57, wherein period of time is up to about 200 seconds.

What is claimed is:

1. A platinum-containing three-way conversion (TWC) catalyst article effective to oxidize carbon monoxide and hydrocarbons and reduce nitrogen oxides in an exhaust gas stream from a gasoline engine, the platinum-containing TWC catalyst article comprising a substrate, a first catalyst composition disposed on at least a portion of the substrate, and a second catalyst composition disposed on at least a portion of the substrate, wherein the second catalyst composition comprises:

a first palladium component, wherein at least a portion of the first palladium component is impregnated on a first refractory metal oxide support, and at least another portion of the first palladium component is impregnated on a first oxygen storage component; and a rhodium component impregnated on a second refractory metal oxide support; and wherein the first catalyst composition comprises:

a second palladium component, wherein at least a portion of the second palladium component is impregnated on a third refractory metal oxide support, and at least another portion of the second palladium component is impregnated on a second oxygen storage component; and a platinum component, wherein the platinum component is impregnated on the third refractory metal oxide support, or wherein the platinum component is impregnated on the second oxygen storage component.

2. The platinum-containing TWC catalytic article of claim 1, wherein the first refractory metal oxide support comprises alumina, zirconia, titania, ceria, or a combination thereof, and wherein the first refractory metal oxide support is optionally doped with a rare earth metal oxide, wherein the rare earth metal oxide is optionally selected from lanthanum oxide, praseodymium oxide, yttrium oxide, neodymium oxide, or any combination thereof.

3. The platinum-containing TWC catalytic article of claim 2, wherein the first refractory metal oxide support is lanthana-alumina, ceria-alumina, zirconia-alumina, ceria-zirconia-alumina, lanthana-zirconia-alumina, or lanthana-neodymia alumina.

4. The platinum-containing TWC catalytic article of claim 1, wherein the first oxygen storage component comprises ceria, zirconia, alumina, silica, titania, lanthana, baria, praseodymia, yttria, samaria, gadolinia, or a combination thereof.

5. The platinum-containing TWC catalytic article of claim 1, wherein the first oxygen storage component is a ceria-zirconia composite comprising zirconia in an amount from about 5 wt % to about 20 wt %, based on the total weight of the ceria-zirconia composite.

6. The platinum-containing TWC catalytic article of claim 1, wherein the rhodium component is present in an amount from about 0.05 wt % to about 5 wt %, based on the total weight of the second layer.

7. The platinum-containing TWC catalytic article of claim 1, wherein the second refractory metal oxide support comprises alumina, zirconia, titania, ceria, or a combination thereof, and wherein the second refractory metal oxide support is optionally doped with a rare earth metal oxide and optionally is lanthana-alumina, ceria-alumina, zirconia-alumina, ceria-zirconia-alumina, lanthana-zirconia-alumina, or lanthana-neodymia alumina.

8. The platinum-containing TWC catalytic article of claim 1, wherein the third refractory metal oxide support comprises alumina, zirconia, titania, ceria, or combinations thereof, and wherein the third refractory metal oxide support is optionally doped with a rare earth metal oxide, wherein the third refractory metal oxide support is optionally lanthana-alumina, ceria-alumina, zirconia-alumina, ceria-zirconia-alumina, lanthana-zirconia-alumina, or lanthana-neodymia alumina.

9. The platinum-containing TWC catalytic article of claim 1, wherein the second oxygen storage component comprises ceria, zirconia, alumina, silica, titania, lanthana, baria, praseodymia, yttria, samaria, gadolinia, or a combination thereof.

10. The platinum-containing TWC catalytic article of claim 1, wherein the oxygen storage component is a ceria-zirconia composite comprising zirconia in an amount from about 5 wt % to about 20 wt %, based on the total weight of the ceria-zirconia composite.

11. The platinum-containing TWC catalytic article of claim 1, wherein the first catalyst composition further comprises a rare earth metal oxide, an alkaline earth metal component, or both, wherein the rare earth metal oxide is optionally lanthanum oxide, praseodymium oxide, yttrium oxide, neodymium oxide, or any combination thereof.

12. The platinum-containing TWC catalytic article of claim 11, wherein the alkaline earth metal component is present in an amount from about 1 wt % to about 40 wt %, based on the total weight of the first layer.

13. The platinum-containing TWC catalytic article of claim 12, wherein the alkaline earth metal component comprises calcium, magnesium, strontium, barium, or a combination thereof, wherein the alkaline earth metal component is optionally barium sulfate.

14. The platinum-containing TWC catalytic article of claim 1, wherein the platinum component is impregnated on the third refractory metal oxide support or the second oxygen storage component.

15. The platinum-containing TWC catalytic article of claim 1, wherein the second catalyst composition comprises:
  lanthana-doped alumina impregnated with a portion of the first palladium component;
  ceria-zirconia impregnated with a portion of the first palladium component;
  alumina impregnated with the rhodium component; and
  lanthanum oxide.

16. The platinum-containing TWC catalytic article of claim 1, wherein the first catalyst composition comprises:
  alumina impregnated with the platinum component and a portion of the second palladium component;
  ceria-zirconia impregnated with a portion of the second palladium component;
  lanthanum oxide; and
  barium sulfate.

17. The platinum-containing TWC catalytic article of claim 1, wherein the first catalyst composition comprises:
  alumina impregnated with a portion of the second palladium component;
  ceria-zirconia impregnated with platinum and a portion of the second palladium component;
  lanthanum oxide; and
  barium sulfate.

18. The platinum-containing TWC catalytic article of claim 1, wherein the substrate is a metal or ceramic monolithic honeycomb substrate or a wall-flow filter substrate or a flow through substrate.

19. The platinum-containing TWC catalytic article of claim 1, wherein the first catalyst composition is disposed on the substrate as a first catalyst layer, and the second catalyst composition is disposed on the first catalyst layer.

20. A system for treating an exhaust gas stream from a gasoline engine, the exhaust gas stream comprising carbon monoxide (CO), the system comprising:
  the platinum-containing three-way conversion (TWC) catalyst article of claim 1, located downstream of and in fluid communication with the gasoline engine;

44 a source of hydrogen gas ($H_2$);
  a feedback sensor located upstream from the platinum-containing TWC catalyst article and in contact with the exhaust gas stream; and
  a control unit in communication with the feedback sensor;
  wherein the system is configured to introduce $H_2$ from the $H_2$ source into the exhaust gas stream upstream of the platinum-containing TWC catalyst article during a cold-start period, and wherein the feedback sensor is configured to provide $H_2$ in the exhaust gas stream by modulating the $H_2$ introduction.

21. The system of claim 20, wherein the feedback sensor comprises a wide-band oxygen sensor (UEGO) and a temperature sensor.

22. The system of claim 20, wherein the source of $H_2$ is an on-board compressed hydrogen vessel or an on-board hydrogen generator.

23. The system of claim 22, wherein the on-board hydrogen generator comprises an alcohol reformer, an ammonia decomposition apparatus, an electrolysis apparatus, a fuel reformer, an exhaust gas reformer, or a combination thereof and is preferably an exhaust gas reformer comprising a catalytic reforming article located upstream from the catalytic article and in fluid communication with the exhaust gas stream.

24. The system of claim 22, wherein the on-board hydrogen generator comprises at least one $H_2$ generating component comprising a dopant comprising nanoparticles of aluminum, nanoparticles of aluminum-nickel, nanoparticles of aluminum/silica, nanoparticles of aluminum/cobalt, nanoparticles of aluminum/magnesium, nanoparticles of alumina, nanoparticles of magnesium, nanoparticles of magnesium-nickel, nanoparticles of zinc, sodium borohydride, or a combination thereof, and wherein the at least one $H_2$ generating component is added to a gasoline fuel prior to combustion of said fuel in the gasoline engine.

25. The system of claim 20, further comprising a $H_2$ injection article upstream from the TWC catalyst article, upstream from the feedback sensor, in fluid communication with the exhaust gas stream and with the $H_2$ source, and in communication with the control unit; and wherein the $H_2$ injection article is configured to introduce $H_2$ from the $H_2$ source into the exhaust gas stream upstream of the catalyst article.

26. The system of claim 20, wherein the system is configured to introduce $H_2$ from the $H_2$ source into the exhaust gas stream when the exhaust gas stream temperature upstream of or within the TWC catalytic article is in a range from about 90° C. to about 190° C.

27. The system of claim 20, wherein, when a temperature of the exhaust gas stream upstream of or within the TWC catalytic article is in a range from about 90° C. to about 550° C., the exhaust gas stream contains no greater than about 20 vol. % of $H_2$.

28. The system of claim 20, wherein the exhaust gas stream contains no greater than about 2 vol. % of $H_2$, or no greater than about 0.5 vol. % of $H_2$.

29. The system of claim 20, wherein the system is configured to introduce $H_2$ from the $H_2$ source into the exhaust gas stream to provide a given $\Delta\lambda$ value no more negative than about −0.345 for a period of time, wherein:

$$\Delta\lambda = \bar{\lambda} - \lambda°;$$

$\lambda°$ is a pre-defined value; and
  $\bar{\lambda}$ is a running average air-to-fuel ratio of the exhaust gas stream, calculated for a length of time according to the formula:

$$\bar{\lambda} = \frac{\sum_{i=1}^{N} \lambda_i}{N};$$

wherein (N) is the number of points comprised in this length of time, and $\lambda_i$ is the air-to-fuel ratio at each point.

30. The system of claim 29, wherein $\Delta\lambda$ is about −0.060, or about −0.014.

31. A method of treating an exhaust gas stream from a gasoline engine, the method comprising:

contacting the exhaust gas stream with the platinum-containing TWC catalyst article of claim 1, located downstream of the gasoline engine and in fluid communication with the exhaust gas stream;

introducing hydrogen gas ($H_2$) from a $H_2$ source into the exhaust gas stream upstream of the platinum-containing TWC catalyst article; and controlling a concentration by volume of $H_2$ in the exhaust gas stream upstream from the platinum-containing TWC catalyst article, wherein controlling the concentration by volume of $H_2$ comprises modulating the $H_2$ introduction.

32. The method of claim 31, wherein controlling the concentration by volume of $H_2$ comprises introducing $H_2$ into the exhaust gas stream when a temperature of the exhaust gas stream upstream from or inside the TWC catalyst article is in a range from about 90° C. to about 550° C., or is in a range from about 90° C. to about 190° C.

33. The method of claim 31, wherein the $H_2$ is introduced for about 200 seconds.

34. The method of claim 31, wherein modulating the $H_2$ introduction comprises:

obtaining a signal from a feedback sensor, a temperature sensor, or a combination thereof, wherein the feedback sensor is located upstream from the TWC catalyst article, and the temperature sensor is located upstream from or inside the TWC catalyst article, and both sensors are in contact with the exhaust gas stream; and controlling a quantity of $H_2$ introduced using the signal.

35. A method of enhancing the cold-start catalytic performance of a platinum-containing TWC catalyst article, wherein the platinum-containing TWC catalyst article comprises a substrate, a first catalyst layer disposed on the substrate, and a second catalyst layer disposed on the first layer, wherein the second catalyst layer comprises a second catalyst composition comprising:

a first palladium component, wherein at least a portion of the first palladium component is impregnated on a first refractory metal oxide support, and at least another portion of the first palladium component is impregnated on a first oxygen storage component; and a rhodium component impregnated on a second refractory metal oxide support; and wherein the first catalyst layer comprises a first catalyst composition comprising:

a second palladium component, wherein at least a portion of the second palladium component is impregnated on a third refractory metal oxide support, and at least another portion of the second palladium component is impregnated on a second oxygen storage component; and a platinum component, wherein the platinum component is impregnated on the third refractory metal oxide support, or wherein the platinum component is impregnated on the second oxygen storage component;

the method comprising:

contacting the exhaust gas stream with the platinum-containing TWC catalyst article, located downstream of a gasoline engine and in fluid communication with an exhaust gas stream;

controlling a concentration by volume of $H_2$ in the exhaust gas stream for a period of time, wherein controlling the concentration by volume of $H_2$ comprises introducing hydrogen gas ($H_2$) from a $H_2$ source into the exhaust gas stream upstream of the TWC catalyst article; and modulating the $H_2$ introduction using a signal from a feed-back sensor.

* * * * *